US 8,480,006 B2

(12) United States Patent
Sanger et al.

(10) Patent No.: US 8,480,006 B2
(45) Date of Patent: Jul. 9, 2013

(54) VEHICLE SUPPLEMENTAL HEATING SYSTEM

(75) Inventors: Jeremy J. Sanger, Milford, MI (US); Franco Garavoglia, Commerce Township, MI (US)

(73) Assignee: Ventech, LLC, Novi, MI (US)

( * ) Notice: Subject to any disclaimer, the term of this patent is extended or adjusted under 35 U.S.C. 154(b) by 1586 days.

(21) Appl. No.: 11/620,682

(22) Filed: Jan. 7, 2007

(65) Prior Publication Data

US 2008/0060375 A1 Mar. 13, 2008

Related U.S. Application Data

(60) Provisional application No. 60/843,083, filed on Sep. 8, 2006.

(51) Int. Cl.
*B60H 1/03* (2006.01)
*B60H 1/02* (2006.01)
*B60H 1/04* (2006.01)
*B60H 1/22* (2006.01)
*F24J 3/00* (2006.01)

(52) U.S. Cl.
USPC .... 237/34; 237/8 A; 237/12.3 B; 237/12.3 R; 122/26; 122/1 C; 122/3; 122/11; 123/142.5 R; 123/41.44; 126/247; 126/344; 137/625.48; 415/55.1

(58) Field of Classification Search
USPC ............... 237/8 A, 8 R, 12.3 B, 12.3 R, 19, 237/34; 122/1 C, 3, 11, 26; 123/41.44, 142.5 R; 126/247, 344; 137/625.48, 878, 881; 165/156; 415/1, 55.1

IPC ............. B60H 1/02,1/03, 1/04, 1/22; F24J 3/00
See application file for complete search history.

(56) References Cited

U.S. PATENT DOCUMENTS 1,760,402 A 5/1930 Derrick
1,915,547 A 6/1933 North et al.
(Continued)

FOREIGN PATENT DOCUMENTS

DE 12 13 270 B 3/1966
DE 1476425 4/1970
(Continued)

OTHER PUBLICATIONS

11620682_2011-02-26_JP_2000225830_A_M_TRANS.pdf; Machine Translation of JP Patent #2000-225830-A.*
(Continued)

*Primary Examiner* — Steven B McAllister
*Assistant Examiner* — Daniel E Namay
(74) *Attorney, Agent, or Firm* — Young Basile

(57) ABSTRACT

Disclosed herein is a supplemental heating system including a liquid heat generator having a hydrodynamic chamber for selectively heating a fluid. The hydrodynamic chamber having an inlet port for delivering the fluid to the hydrodynamic chamber, and a discharge port for removing heated fluid from the hydrodynamic chamber. The inlet port is fluidly connected to a first check valve and the discharge port is fluidly connected to a second check valve. The first check valve adapted to receive an input from the second check valve. The first check valve operable to close the fluid path between the first check valve and the inlet port in response to an input received from the second check valve.

25 Claims, 28 Drawing Sheets

U.S. PATENT DOCUMENTS

| | | | |
|---|---|---|---|
| 2,428,005 A | 9/1947 | Bennett |
| 2,496,497 A | 2/1950 | Russell |
| 2,541,227 A | 2/1951 | Findley |
| 2,542,390 A | 2/1951 | Brown |
| 2,570,768 A | 10/1951 | Clerk |
| 2,672,954 A | 3/1954 | Bennett |
| 2,748,762 A | 6/1956 | Booth |
| 2,748,899 A | 6/1956 | Booth et al. |
| 2,749,049 A | 6/1956 | Smith |
| 2,750,009 A | 6/1956 | Pohl |
| 2,827,989 A | 3/1958 | Christenson |
| 2,889,013 A | 6/1959 | Schneider |
| 2,990,919 A | 7/1961 | Christenson et al. |
| 3,024,876 A | 3/1962 | Montgomery |
| 3,051,273 A | 8/1962 | Cordiano et al. |
| 3,122,319 A | 2/1964 | Friedel et al. |
| 3,136,392 A | 6/1964 | Rodway |
| 3,139,158 A | 6/1964 | Sieving |
| 3,146,863 A | 9/1964 | Herbenar et al. |
| 3,164,961 A | 1/1965 | Schroder |
| 3,178,889 A | 4/1965 | Nelden |
| 3,265,162 A | 8/1966 | Botterill |
| 3,270,838 A | 9/1966 | Schweizer |
| 3,330,386 A | 7/1967 | Bertram et al. |
| 3,405,524 A | 10/1968 | Nelden |
| 3,451,511 A | 6/1969 | Knapp |
| 3,461,913 A | 8/1969 | Scott |
| 3,467,225 A | 9/1969 | Steffen et al. |
| 3,512,616 A | 5/1970 | Bessiere |
| 3,591,079 A | 7/1971 | Peters |
| 3,601,211 A | 8/1971 | Finke |
| 3,650,358 A | 3/1972 | Bessiere |
| 3,684,335 A | 8/1972 | Franke et al. |
| 3,701,599 A | 10/1972 | Stewart |
| 3,707,168 A | 12/1972 | Boelkins |
| 3,720,372 A | 3/1973 | Jacobs |
| 3,756,028 A | 9/1973 | Bopp et al. |
| 3,774,734 A | 11/1973 | Forster et al. |
| 3,774,735 A | 11/1973 | Hanke et al. |
| 3,860,097 A | 1/1975 | Braschler et al. |
| 3,888,335 A | 6/1975 | Hanke |
| 3,919,844 A | 11/1975 | Elderton |
| 3,924,713 A | 12/1975 | Bessiere |
| 3,941,224 A | 3/1976 | Hanke |
| 3,952,508 A | 4/1976 | Bopp |
| 3,955,597 A | 5/1976 | Oneyama et al. |
| 3,989,127 A | 11/1976 | Staudenmaier et al. |
| 4,004,660 A | 1/1977 | Shore et al. |
| 4,043,434 A | 8/1977 | Braschler |
| 4,061,214 A | 12/1977 | Ternehall |
| 4,073,139 A | 2/1978 | Armasow et al. |
| 4,175,647 A | 11/1979 | Hanke |
| 4,187,884 A | 2/1980 | Loveless |
| 4,201,050 A | 5/1980 | Nixel |
| 4,257,504 A | 3/1981 | Hanke |
| 4,276,970 A | 7/1981 | Herrmann et al. |
| 4,285,329 A | 8/1981 | Moline |
| 4,373,666 A | 2/1983 | Williams |
| 4,386,735 A | 6/1983 | Tholen |
| 4,396,007 A | 8/1983 | Siemiller |
| 4,405,038 A | 9/1983 | Ternehall |
| 4,407,449 A | 10/1983 | Moser et al. |
| 4,411,340 A | 10/1983 | Brosius et al. |
| 4,430,966 A | 2/1984 | Marandet et al. |
| 4,432,442 A | 2/1984 | Vogelsang |
| 4,440,272 A | 4/1984 | Bieber |
| 4,454,935 A | 6/1984 | Pryor |
| 4,458,792 A | 7/1984 | Thomas et al. |
| 4,474,270 A | 10/1984 | Vogelsang |
| 4,483,325 A | 11/1984 | Siemiller |
| 4,493,293 A | 1/1985 | Paul et al. |
| 4,538,553 A | 9/1985 | Kurz et al. |
| 4,597,481 A | 7/1986 | Muller et al. |
| 4,664,068 A | 5/1987 | Kretchmar et al. |
| 4,671,061 A | 6/1987 | Elderton |
| 4,699,022 A | 10/1987 | Stadt et al. |
| 4,733,635 A | 3/1988 | Menard et al. |
| 4,773,513 A | 9/1988 | Herrmann et al. |
| 4,836,341 A * | 6/1989 | Hall, III ................ 188/290 |
| 4,892,248 A | 1/1990 | Robin et al. |
| 4,922,872 A | 5/1990 | Nogami et al. |
| 4,938,323 A | 7/1990 | Holler et al. |
| 4,974,778 A | 12/1990 | Bertling |
| 4,993,377 A | 2/1991 | Itakura |
| 5,048,752 A | 9/1991 | Hinetnnach et al. |
| 5,090,523 A | 2/1992 | Vogelsang |
| 5,174,334 A | 12/1992 | Nogle |
| 5,184,643 A | 2/1993 | Raymond |
| 5,193,654 A | 3/1993 | Vogelsang |
| 5,286,939 A | 2/1994 | Martin |
| 5,333,707 A | 8/1994 | Kaneda |
| 5,335,982 A | 8/1994 | Ando et al. |
| 5,407,130 A * | 4/1995 | Uyeki et al. ............ 237/12.3 B |
| 5,414,331 A | 5/1995 | Izawa et al. |
| 5,472,268 A * | 12/1995 | Ando et al. ................ 303/117.1 |
| 5,564,627 A | 10/1996 | Veitenhansl |
| 5,657,723 A | 8/1997 | Edelmann et al. |
| 5,657,838 A | 8/1997 | Vogelsang et al. |
| 5,683,031 A | 11/1997 | Sanger |
| 5,752,499 A | 5/1998 | Mori et al. |
| 5,775,583 A | 7/1998 | Braatz |
| 5,779,008 A | 7/1998 | Vogelsang et al. |
| 5,788,151 A | 8/1998 | Moroi et al. |
| 5,794,588 A | 8/1998 | Vogelsang et al. |
| 5,819,697 A | 10/1998 | Edelmann et al. |
| 5,829,562 A | 11/1998 | Adams et al. |
| 5,829,675 A | 11/1998 | Ban |
| 5,845,608 A | 12/1998 | Ban et al. |
| 5,873,342 A | 2/1999 | Friedrich et al. |
| 5,878,951 A | 3/1999 | Moroi et al. |
| 5,906,177 A | 5/1999 | Okabe et al. |
| 5,934,097 A | 8/1999 | Karl |
| 5,934,430 A | 8/1999 | Kolomeitsev et al. |
| 5,954,266 A | 9/1999 | Hoshino et al. |
| 6,058,928 A | 5/2000 | Sitko et al. |
| 6,082,316 A * | 7/2000 | Ban et al. ................ 123/142.5 R |
| 6,116,514 A | 9/2000 | Moroi et al. |
| 6,138,920 A | 10/2000 | Ban et al. |
| 6,167,993 B1 | 1/2001 | Adams et al. |
| 6,234,285 B1 | 5/2001 | Friedrich et al. |
| 6,308,896 B1 | 10/2001 | Moroi et al. |
| 6,371,381 B1 | 4/2002 | Niwa et al. |
| 6,412,884 B1 | 7/2002 | Takayama et al. |
| 6,558,112 B2 * | 5/2003 | Moroi et al. ................ 415/1 |
| 6,561,324 B2 * | 5/2003 | Friedrich et al. ............ 188/296 |
| 6,616,059 B2 * | 9/2003 | Sabhapathy et al. ...... 237/12.3 B |
| 6,695,415 B2 | 2/2004 | Stephan |
| 6,811,374 B2 | 11/2004 | Brisson et al. |
| 6,811,375 B2 | 11/2004 | Brisson et al. |
| 6,883,474 B2 | 4/2005 | Bucknor |
| 6,896,191 B2 | 5/2005 | Augenstein et al. |
| 7,063,137 B2 * | 6/2006 | Kadle et al. ................ 165/202 |
| 7,069,728 B2 | 7/2006 | Bruno et al. |
| 7,318,553 B2 | 1/2008 | Thoma |
| 7,387,262 B2 | 6/2008 | Thoma |
| 7,647,896 B2 | 1/2010 | Isopo et al. |
| 7,793,856 B2 | 9/2010 | Hernandez et al. |
| 2001/0018832 A1 | 9/2001 | Matsunaga |
| 2002/0005181 A1 * | 1/2002 | Moroi et al. ............ 123/142.5 R |
| 2005/0205682 A1 | 9/2005 | Sanger et al. |
| 2008/0060375 A1 | 3/2008 | Sanger et al. |

FOREIGN PATENT DOCUMENTS

| | | |
|---|---|---|
| DE | 19730678 | 4/1970 |
| DE | 2135268 | 1/1973 |
| DE | 3147468 | 12/1982 |
| DE | 3241835 | 2/1984 |
| DE | 3301560 | 4/1984 |
| DE | 3828470 | 3/1990 |
| DE | 4415031 | 5/1995 |
| DE | 19714668 A1 * | 10/1997 |
| DE | 3713580 | 11/1998 |
| DE | 19744529 | 2/1999 |
| DE | 19847607 | 4/2000 |
| DE | 198 50 064 A1 | 5/2000 |
| DE | 19901807 | 7/2000 |
| DE | 10028280 | 4/2001 |

| | | | |
|---|---|---|---|
| DE | 10136888 | | 2/2003 |
| DE | 10144845 | | 3/2003 |
| EP | 800941 | A2 * | 10/1997 |
| EP | 0826530 | | 3/1998 |
| EP | 1122104 | A2 * | 8/2001 |
| EP | 0796752 | | 11/2001 |
| EP | 0842800 | | 2/2003 |
| FR | 2263903 | | 10/1979 |
| GB | 2134245 | | 8/1984 |
| JP | 61093340 | A | 5/1986 |
| JP | 02246823 | A | 10/1990 |
| JP | 02254010 | A * | 10/1990 |
| JP | 09277817 | A * | 10/1997 |
| JP | 9315133 | | 12/1997 |
| JP | 10006758 | A * | 1/1998 |
| JP | 10044749 | | 2/1998 |
| JP | 10 297265 | A | 11/1998 |
| JP | 2000211343 | A | 8/2000 |
| JP | 2000225830 | A * | 8/2000 |
| JP | 2000329086 | A | 11/2000 |
| JP | 2001333557 | A | 11/2001 |
| JP | 2002031075 | A | 1/2002 |
| JP | 2002181381 | A | 6/2002 |
| JP | 2007505284 | T | 3/2007 |
| KP | 100478217 | | 3/2005 |
| WO | WO-02/081979 | A1 | 10/2002 |
| WO | WO 03099596 | A1 * | 12/2003 |
| WO | WO 2005082653 | A1 * | 9/2005 |
| WO | WO-2008 058376 | A1 | 5/2008 |

OTHER PUBLICATIONS

PCT International Search Report for PCT/US08/50398 dated Sep. 10, 2008.

International Preliminary Report on Patentability dated Mar. 27, 2006 for International Application No. PCT/US05/06545.

Supplementary European Search Report for EP05724145 dated Oct. 30, 2009.

PCT International Search Report for PCT/US08/50398 dated Jan. 7, 2008.

Non-Final Office Action dated Jan. 4, 2011 from U.S. Appl. No. 11/068,285.

Non-Final Office Action dated Feb. 22, 2011 for U.S. Appl. No. 12/098,061.

PCT International Search Reported dated Mar. 8, 2010 for PCT/US2009/052113.

Supplemental European Search Report dated May 6, 2011 for EP08754821.

Response to Non-Final Office Action dated Jan. 4, 2011 for U.S. Appl. No. 11/068,285.

Notice of Allowance dated Jul. 11, 2011 for U.S. Appl. No. 12/141,592.

Response to Non-Final Office Action dated Feb. 22, 2011 for U.S. Appl. No. 12/098,061.

English Language Abstract for JP 61093340, (Jul. 14, 2009).

English Language Abstract for JP 2002181381, (Jul. 14, 2009).

English Language Abstract for JP 2002031075, (Jul. 14, 2009).

Russian Official Action (with translation) dated Feb. 27, 2009.

Russian Official Action issued Jun. 9, 2012.

EPO Office Action issued Apr. 24, 2012.

Indian Office Action issued Mar. 15, 2012.

Korean Office Action issued Oct. 12, 2012.

* cited by examiner

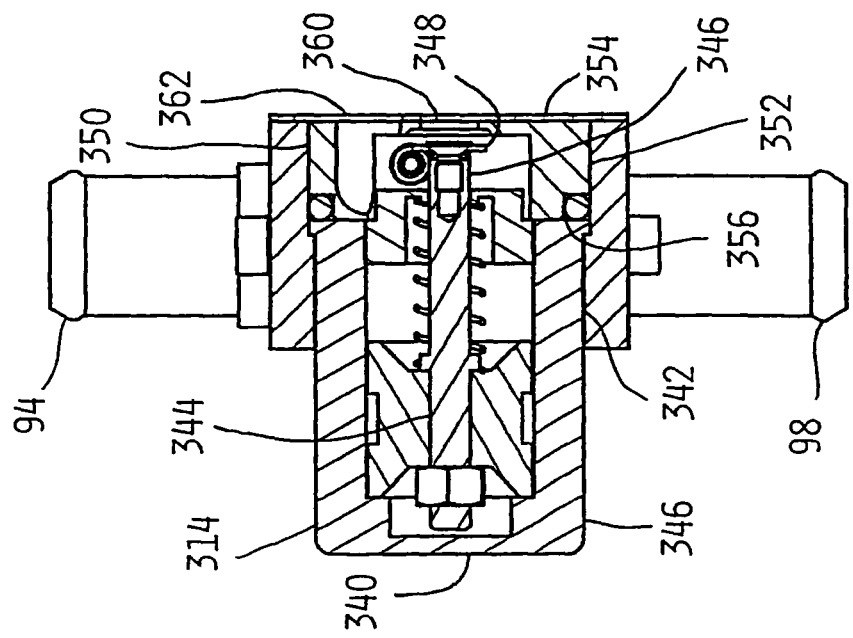
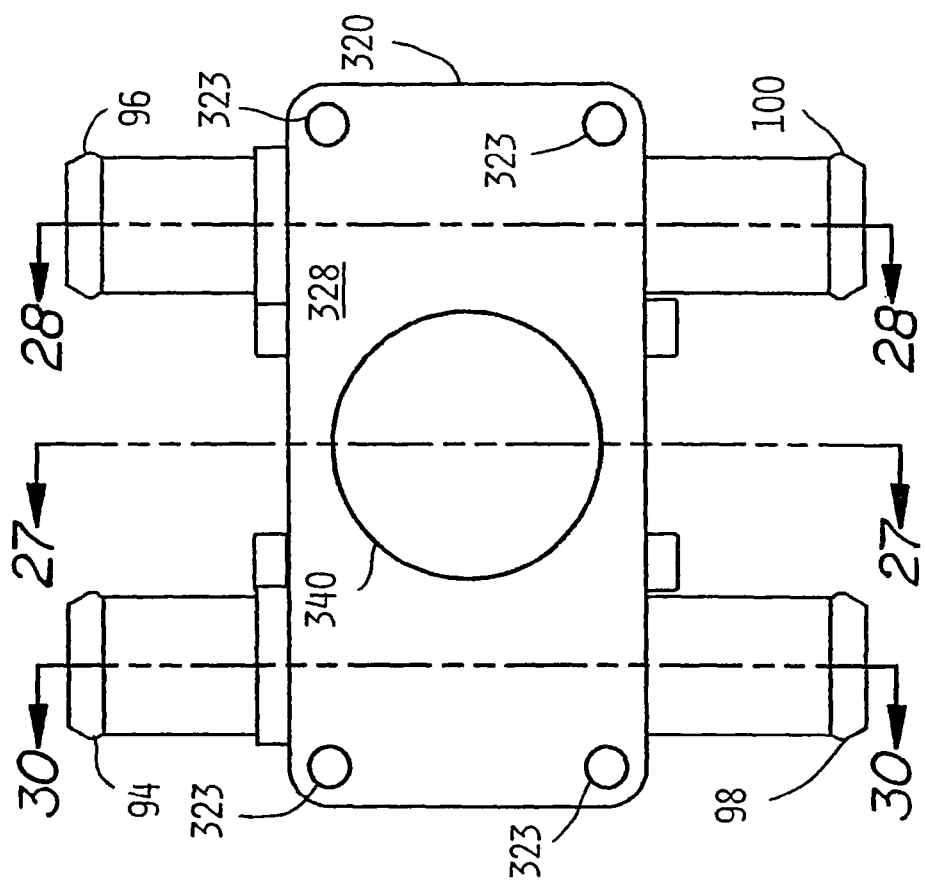

VEHICLE SUPPLEMENTAL HEATING SYSTEM

RELATED APPLICATIONS

This application claims benefit of U.S. Provisional Patent Application Ser. No. 60/843,083 filed on Sep. 8, 2006, which is incorporated by reference herein in its entirety.

FIELD OF THE INVENTION

The present invention relates in general to heat generators, and more particularly, to a supplemental liquid heating system for providing supplemental heat to a passenger compartment of an automotive vehicle.

BACKGROUND

Conventional automotive vehicles typically include a heating system for supplying warm air to a passenger compartment of the vehicle. The heating system includes a control system that allows a vehicle operator to regulate the quantity and/or temperature of air delivered to the passenger compartment so as to achieve a desirable air temperature within the passenger compartment. Cooling fluid from the vehicle's engine cooling system is commonly used as a source of heat for heating the air delivered to the passenger compartment.

The heating system typically includes a heat exchanger fluidly connected to the vehicle's engine cooling system. Warm cooling fluid from the engine cooling system passes through the heat exchanger where and gives up heat to a cool air supply flowing through the heating system. The heat energy transferred from the warm cooling fluid to the cool air supply causes the temperature of the air to rise. The heated air is discharged into the passenger compartment to warm the interior of the vehicle to a desired air temperature.

The vehicle's engine cooling system provides a convenient source of heat for heating the vehicle's passenger compartment. One disadvantage of using the engine cooling fluid as a heat source, however, is that there is typically a significant delay between when the vehicle's engine is first started and when the heating system begins supplying air at a preferred temperature. This is particularly true when the vehicle is operated in very cold ambient conditions or has sat idle for a period of time. The delay is due to the cooling fluid being at substantially the same temperature as the air flowing through the heating system and into the passenger compartment when the engine is first started. As the engine continues to operate, a portion of the heat generated as a byproduct of combusting a mixture of fuel and air in the engine cylinders is transferred to the cooling fluid, causing the temperature of the cooling fluid to rise. Since, the temperature of the air being discharged from the heating system is a function of the temperature of the cooling fluid passing through the heat exchanger, the heating system will produce proportionally less heat while the engine cooling fluid is warming up than when the cooling fluid is at a preferred operating temperature. Thus, there may be an extended period of time between when the vehicle's engine is first started and when the heating system begins producing air at an acceptable temperature level. The time it takes for this to occur will vary depending on various factors, including the initial temperature of the cooling fluid and the initial temperature of the air being heated. It is preferable that the temperature of the cooling fluid reach its preferred operating temperature as quickly as possible.

Another potential limitation of using the engine cooling fluid as a heat source for the vehicle's heating system is that under certain operating conditions the engine may not be rejecting enough heat to the cooling fluid to enable the air stream from the vehicle's heating system to achieve a desired temperature. This may occur, for example, when operating a vehicle with a very efficient engine under a low load condition or in conditions where the outside ambient temperature is unusually cold. Both of these conditions reduce the amount of heat that needs to be transferred from the engine to the cooling fluid to maintain a desired engine operating temperature. This results in less heat energy available for heating the air flowing through the vehicle's heating system.

Accordingly it is desirable to develop a supplemental heating system capable of intermittently providing additional heating of an engine's cooling fluid so as to improve the heating efficiency of the vehicles' passenger compartment heating system.

SUMMARY

A supplemental heating system is provided including a liquid heat generator having a hydrodynamic chamber for selectively heating a fluid. The hydrodynamic chamber having an inlet port for delivering the fluid to the hydrodynamic chamber, and a discharge port for removing heated fluid from the hydrodynamic chamber. The inlet port is fluidly connected to a first check valve and the discharge port is fluidly connected to a second check valve. The first check valve adapted to receive an input from the second check valve. The first check valve operable to close the fluid path between the first check valve and the inlet port in response to an input received from the second check valve.

BRIEF DESCRIPTION OF THE DRAWINGS

The present invention will become more fully understood from the detailed description and accompanying drawings, wherein:

FIG. 26 is a top elevation view of the dual check valve fluid distribution module shown detached from the supplemental heating system;

FIG. 27 is cross-section view of the dual check valve fluid distribution module taken along section 27-27;

DESCRIPTION OF PREFERRED EMBODIMENTS

The following description of the preferred embodiments is merely exemplary in nature and is in no way intended to limit the invention, its application, or uses.

Figure 1:
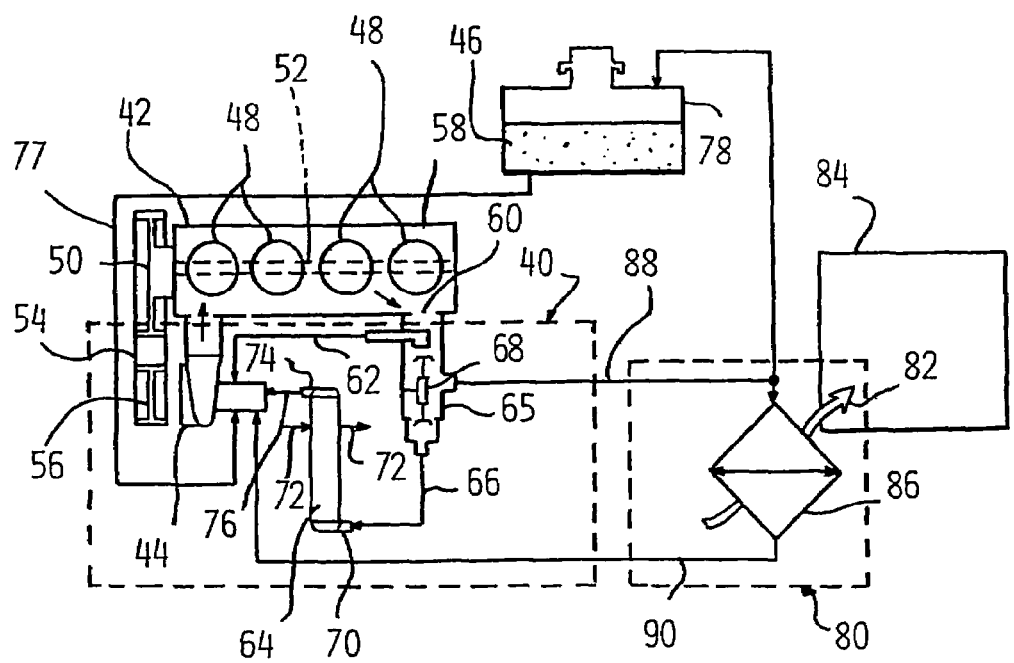
FIG. 1 is a schematic depiction of a conventional engine cooling system and passenger compartment heating system.

Referring to FIG. 1, a conventional vehicle cooling system 40 for regulating the operating temperature of an engine 42 may include a water pump 44, which circulates a cooling fluid 46 through engine 42. Cooling fluid 46 absorbs heat produced by engine 42 as a byproduct of combusting a mixture of fuel and air in cylinders 48 of engine 42 to produce usable mechanical work for propelling the vehicle. Engine 42 includes an accessory drive 50 for providing power to drive various vehicle accessories, such as a generator, air conditioning compressor, and water pump 44. Accessory drive 50 is connected to a crankshaft 52 of engine 42. Water pump 44 is connected to accessory drive 50 by means of drive belt 54, which engages a sheave 56 of water pump 44. Heat from engine 42 is transferred to cooling fluid 46 as it circulates through passages formed in an engine block 58. Cooling fluid 46 is discharged from engine 42 through an engine discharge port 60, and depending on the temperature of the cooling fluid exiting the engine, is either directed to water pump 44 through a water pump supply passage 62, or to a radiator 64 through a radiator supply passage 66.

A thermostat 65 controls distribution of cooling fluid 46 between water pump supply passage 62 and radiator supply passage 66. Thermostat 65 may include a thermally activated valve 68 that automatically adjusts a thru-flow area of the thermostat in response to a change in the temperature of cooling fluid 46 exiting engine 42 through discharge passage 60. Thermostat 65 can be calibrated to begin opening at a desired cooling fluid temperature. Thermostat 65 may be closed at cooling fluid temperatures below the calibrated temperature to prevent cooling fluid 46 from traveling to radiator 64 through supply passage 66. At a temperature at or slightly above the calibrated temperature, thermostat 65 will begin to open and allow a portion of cooling fluid 46 to pass through radiator supply passage 66 to radiator 64. Thermostat 65 may be fully open at cooling fluid temperatures significantly higher than the calibrated temperature, which will maximize the fluid flow rate to radiator 64 for a particular vehicle operating condition.

Cooling fluid 46 flowing through radiator supply passage 66 enters radiator 64 through an inlet port 70. Cooling fluid 46 passes through radiator 64, where a portion of its heat can be transferred to a stream of ambient air 72 flowing crosswise through the radiator. Cooling fluid 46 exits radiator 64 through an outlet port 74 at a lower temperature than when it entered. Upon exiting radiator 64, cooling fluid 46 travels through a radiator discharge passage 76 to water pump 44.

Engine cooling system 40 may include an expansion tank 78 fluidly connected to water pump 44 through expansion tank supply passage 77. Expansion tank 78 provides a reservoir for capturing cooling fluid 46 discharged from cooling system 40, which may occur for example, when the cooling fluid expands due to heating following an engine cold start. Conversely, a portion of cooling fluid 46 may be withdrawn from expansion tank 78 and returned to cooling system 40 through expansion tank supply passage 77 when, for example, the temperature of the cooling fluid decreases after turning off engine 42.

Conventional automotive vehicles typically include a heating system 80 that provides a supply of warm air 82 for heating a passenger compartment 84 of the vehicle. Heating system 80 includes a cabin heat exchanger 86, which is fluidly connected to cooling system 40 through a heater inlet passage 88 and heater exit passage 90. Heater inlet passage 88 can be fluidly connected to cooling system 40 at thermostat 65, or another suitable location. A portion of cooling fluid 46 exiting engine 42 at engine discharge port 60 passes through heater inlet passage 88 to cabin heat exchanger 86. Cooling fluid 46 may reject a portion of its heat to airstream 82 flowing through cabin heat exchanger 86. Airstream 82 may consist of air drawn from outside the vehicle, from passenger compartment 84, or a combination thereof. Airstream 82 exits cabin heat exchanger 86 at a higher temperature than when it entered. Airstream 82 can be discharged into passenger compartment 84 to warm the interior of the vehicle. Airstream 82 can also be directed to flow over an interior glass surface of the vehicle to remove frost or condensation that may have formed on the glass surface. Heating system 80 may also include various control devices for regulating the temperature and flow rate of airstream 82 delivered to passenger compartment 84.

Figure 2:
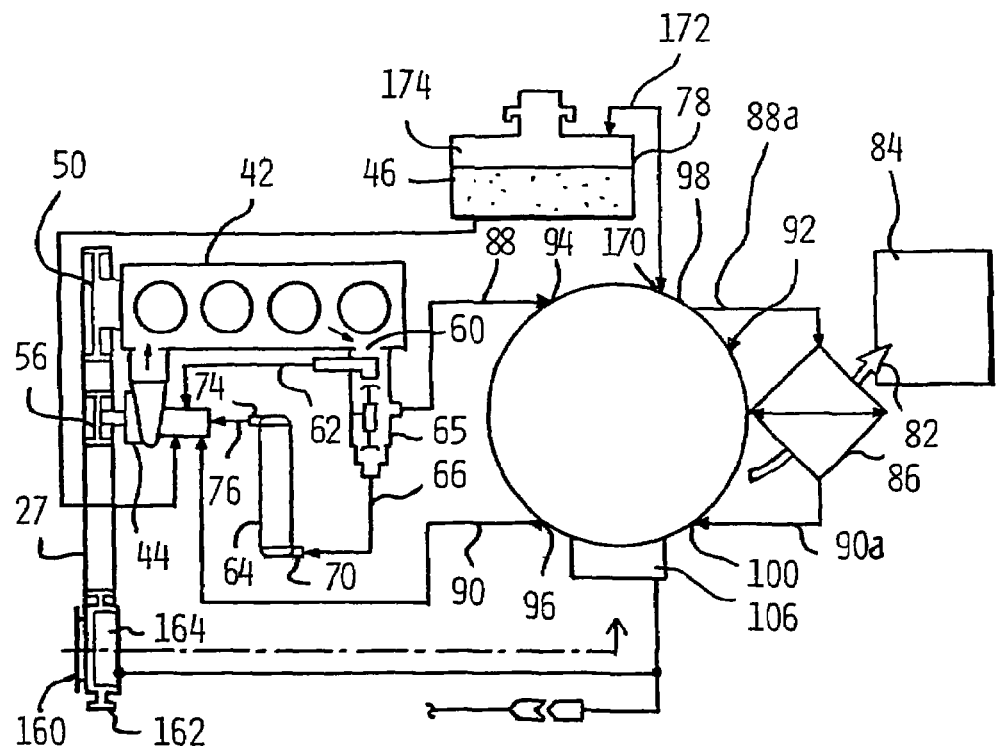
FIG. 2 is schematic depiction of the vehicle supplemental heating system of the present invention integrated with the engine cooling system and heating shown in FIG. 1.

Referring also to FIG. 2, a supplemental heating system (SHS) 92 may be fluidly connected between cooling system 40 and heating system 80. Supplemental heating system 92 controls distribution of cooling fluid 46 between cooling system 40 and heating system 80, as well as providing additional heat, if necessary, to cooling fluid 46 supplied to cabin heat exchanger 86.

Supplemental heating system 92 can be fluidly connected to cooling system 40 through heater inlet passage 88 and heater exit passage 90. Heater inlet and exit passages 88 and 90 are fluidly connected to supplemental heating system 92 at a port 94 and 96, respectively. Cooling fluid 46 can be transferred from cooling system 40 to supplemental heating system 92 through heater inlet passage 88 and returned through heater exit passage 90.

Supplemental heating system 92 may be fluidly connected to cabin heat exchanger 86 through a cabin heat exchanger inlet passage 88a connected to a port 98 of the supplemental heating system, and a cabin heat exchanger discharge passage 90a connected to a port 100. Cooling fluid 46 circulating within supplemental heating system 92 can exit the system at port 98 and travel through heater inlet passage 88a to cabin heat exchanger 86, where a portion of the heat from cooling fluid 46 can be transferred to airstream 82. Upon exiting cabin heat exchanger 86, cooling fluid 46 can be directed back to supplemental heating system 92 through heater discharge exit passage 90a.

Figure 3:
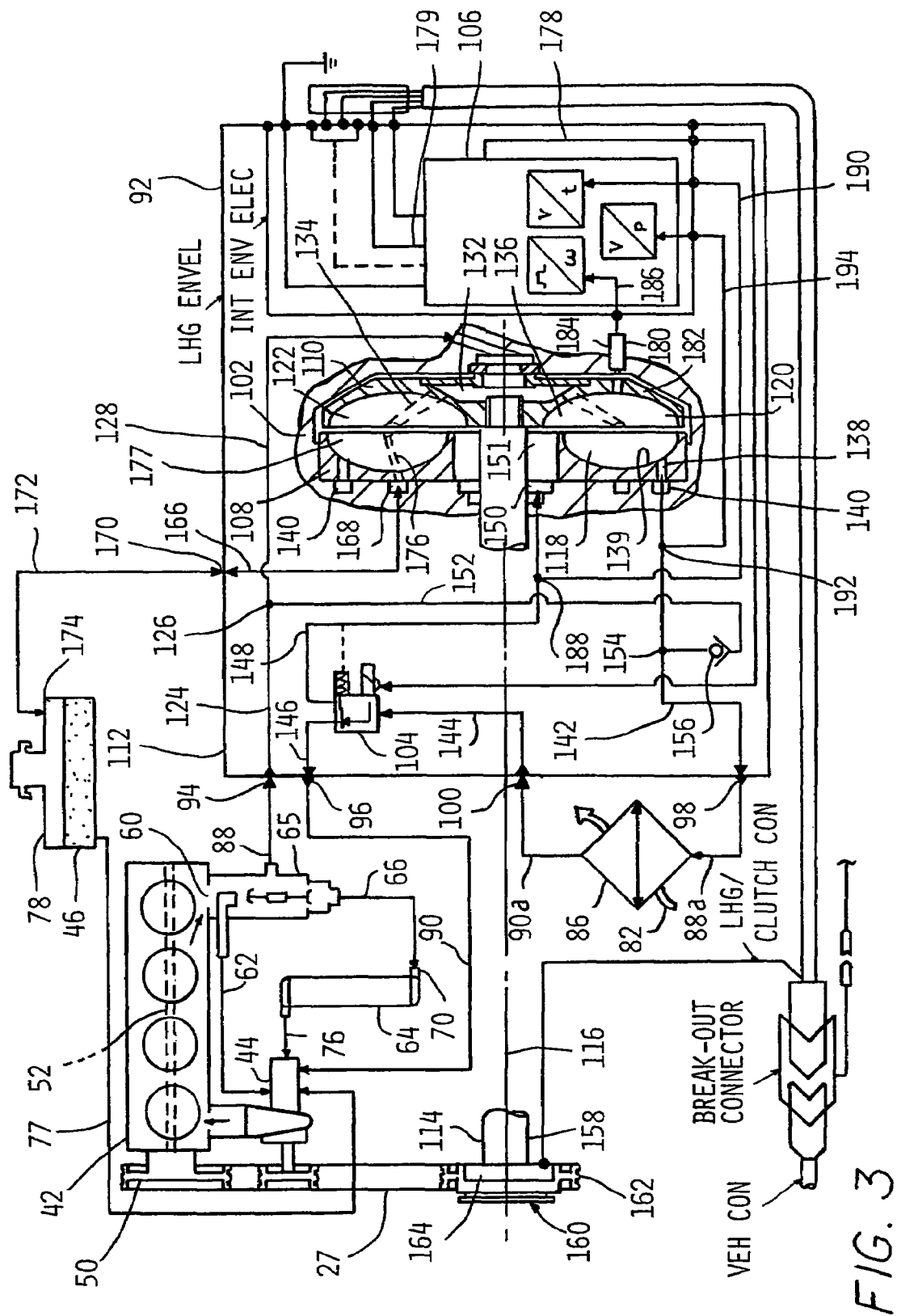
FIG. 3 is a schematic depiction of a supplemental heating system incorporating a spool valve for controlling distribution of cooling fluid within the system.
Figure 4:
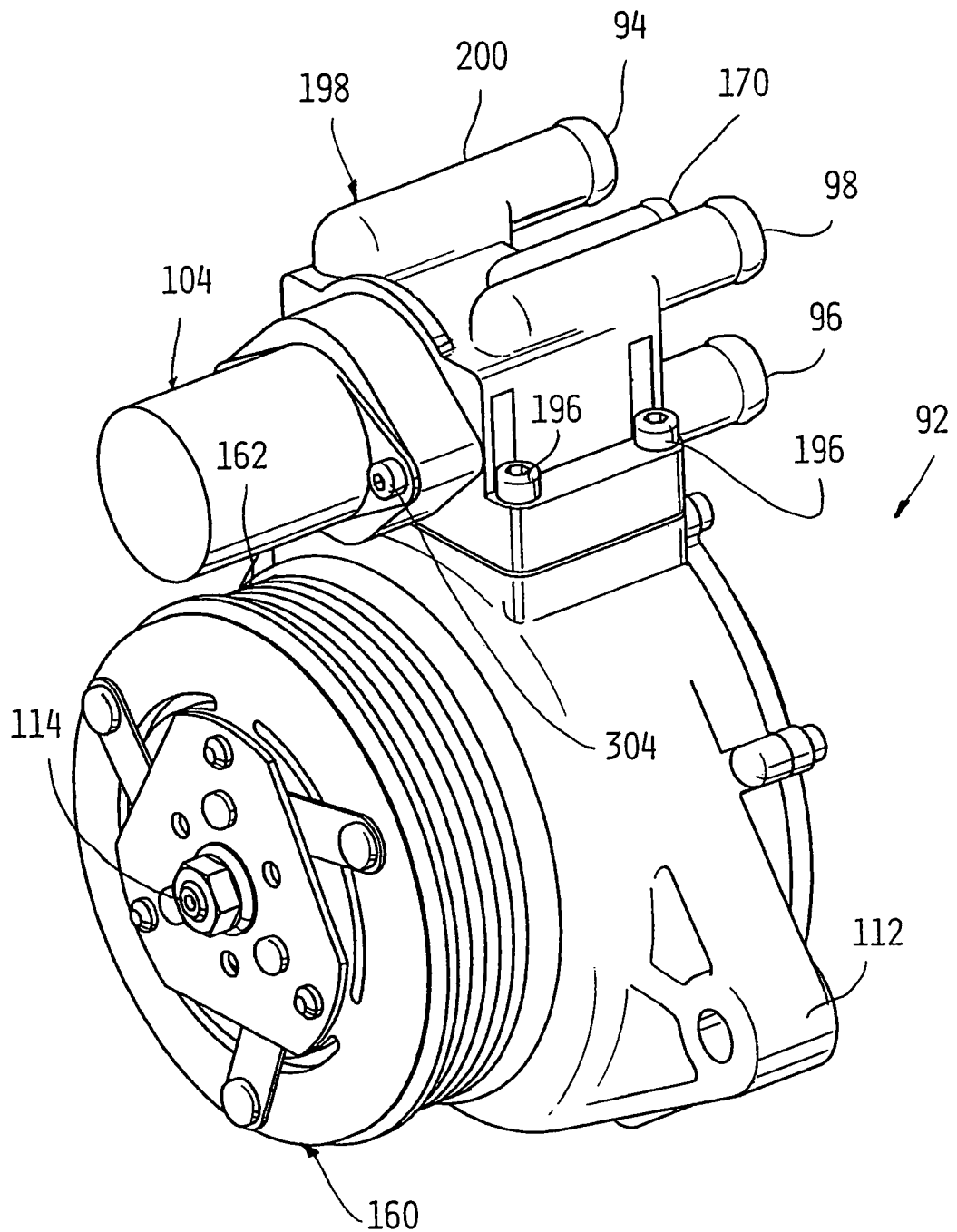
FIG. 4 is a is a front perspective view of the supplemental heating system employing the spool valve.
Figure 5:
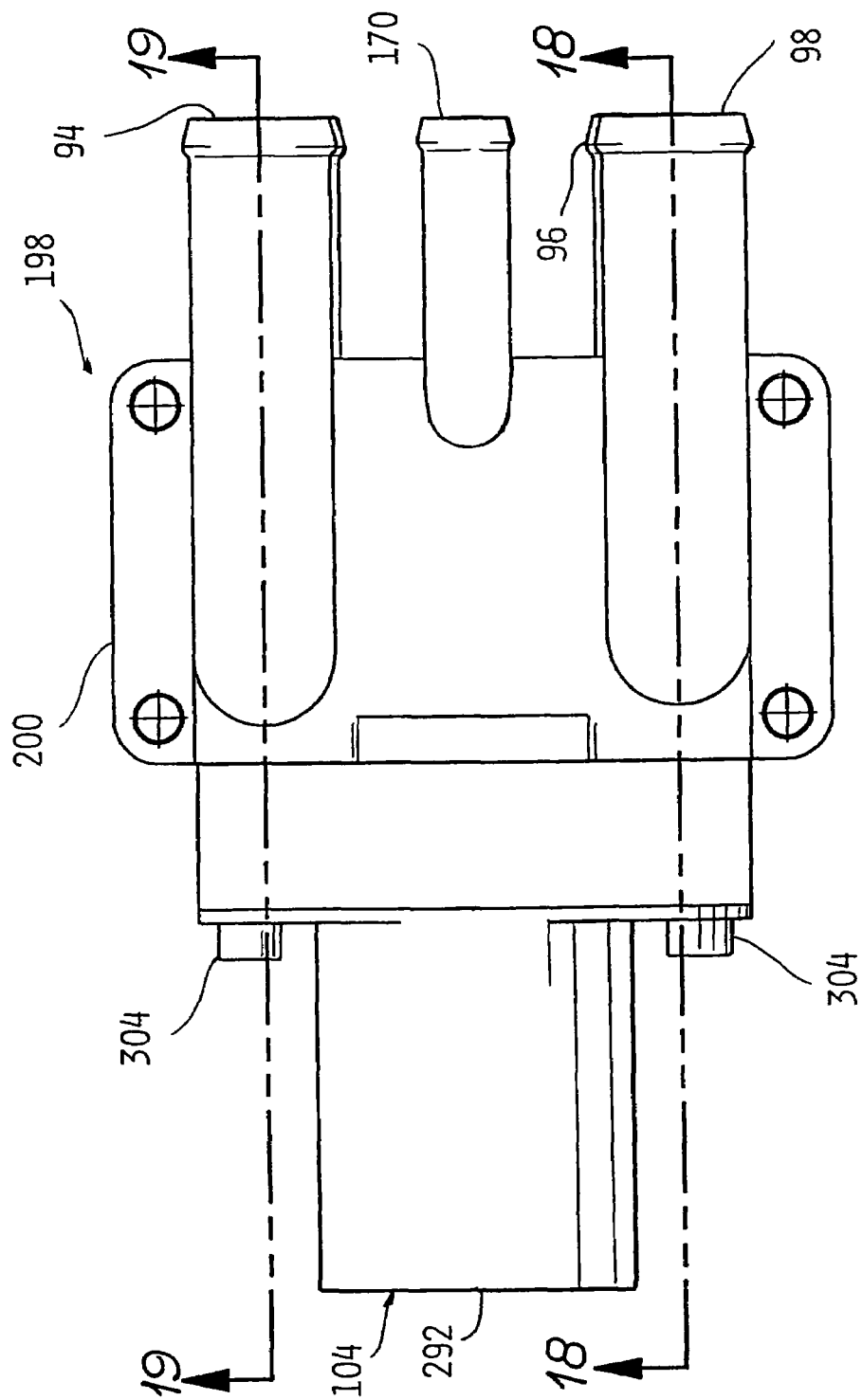
FIG. 5 is top elevational view of a fluid distribution module of the supplemental heating system.
Figure 6:
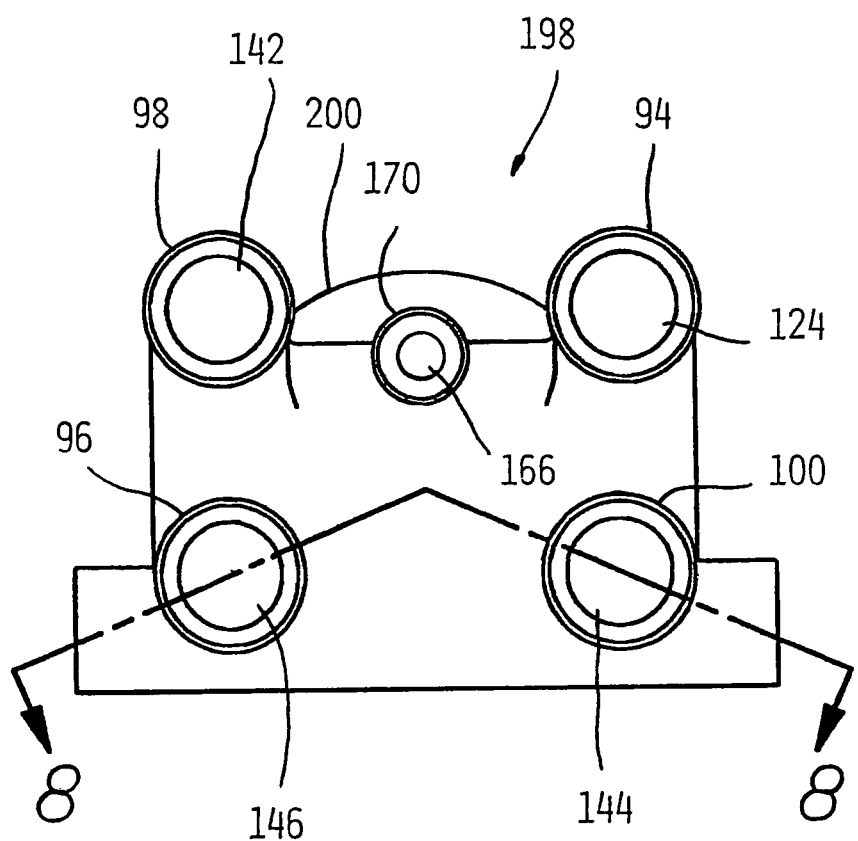
FIG. 6 is rear elevational view of the fluid distribution module of the supplemental heating system.
Figure 7:
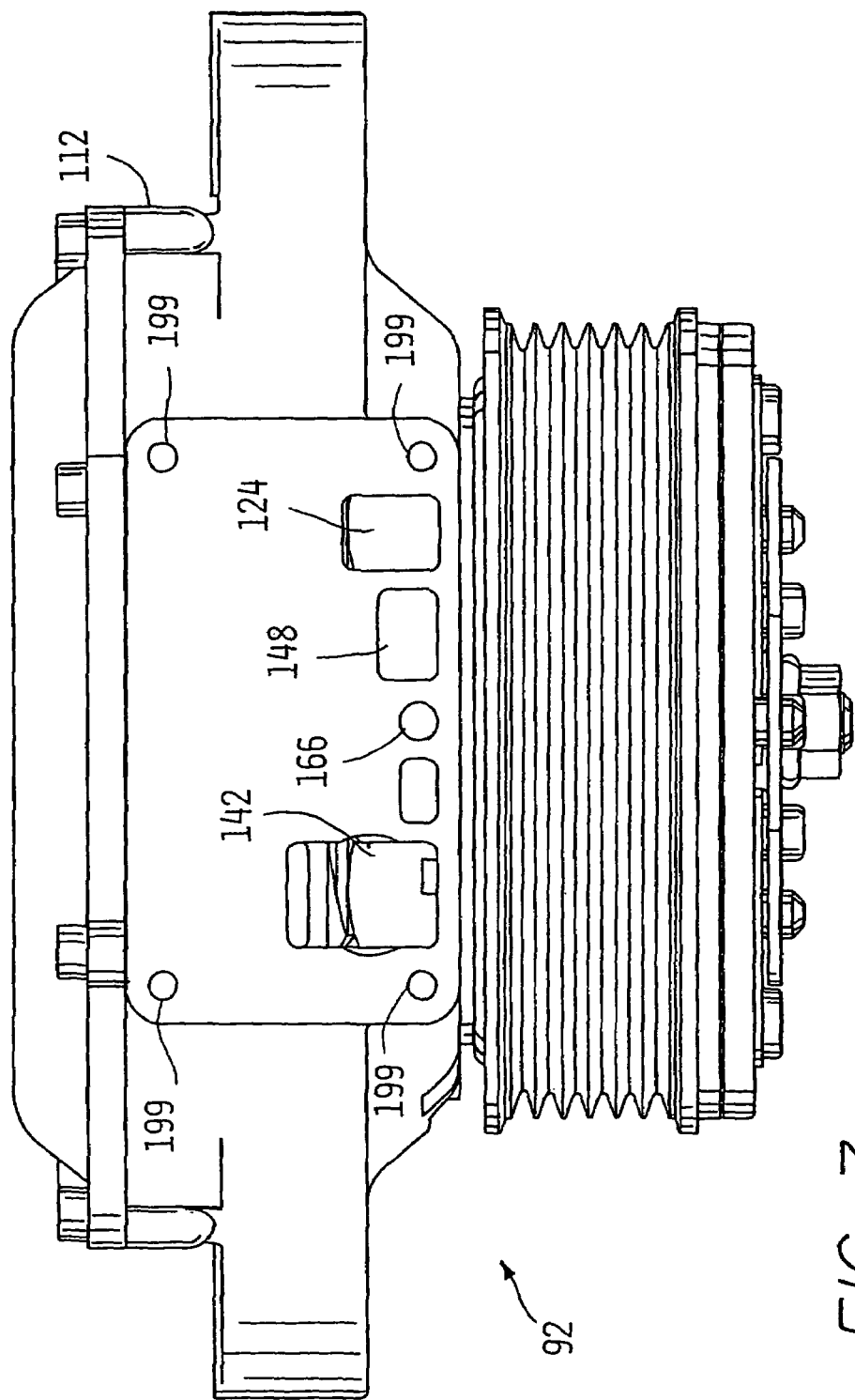
FIG. 7 is a top elevational view of the supplemental heating system with the fluid distribution module removed.

Referring also to FIG. 3, supplemental heating system 92 includes a liquid heat generator (LHG) 102 for heating cooling fluid 46 supplied to cabin heat exchanger 86. An example of one such liquid heat generator is disclosed in U.S. Pat. No. 5,683,031, entitled Liquid Heat Generator, which issued to Sanger on Nov. 4, 1997. The U.S. Pat. No. 5,683,031 patent is incorporated herein by reference. Supplemental heating system 92 may also include a control valve 104 for controlling distribution of cooling fluid 46 within supplemental heating system 92, and a controller 106 for regulating operation of liquid heat generator 102 and control valve 104.

Liquid heat generator 102 includes a stator 108 and a coaxially aligned rotor 110 positioned adjacent stator 108. Stator 108 is fixedly attached to a housing 112 of the supplemental heating system. Rotor 110 can be mounted on a drive shaft 114 for concurrent rotation therewith about an axis 116. Stator 108 and rotor 110 define annular cavities 118 and 120, respectively, which together define a hydrodynamic chamber 122. Heating of cooling fluid 46 occurs within hydrodynamic chamber 122.

Hydrodynamic chamber 122 can be fluidly connected to cooling system 40 through heater inlet passage 88. Cooling fluid 46 from cooling system 40 travels through a coolant supply passage 124 connected to heater inlet passage 88 at port 94. Fluidly attached to supply passage 124 at fluid junction 126 is a hydrodynamic chamber supply passage 128. Cooling fluid 46 passing through hydrodynamic chamber supply passage 128 is discharged to a hollow cavity 132 formed in the back of rotor 110. One or more rotor passages 134 fluidly connect cavity 132 to hydrodynamic chamber 122. Rotor passage 134 extends through a blade 136 of rotor 110, and has one end fluidly connected to cavity 132 and an opposite end to hydrodynamic chamber 122.

Cooling fluid 46 present in hydrodynamic chamber 122 travels along a generally toroidal path within the chamber, absorbing heat as the fluid travels between annular cavities 118 and 120 of stator 108 and rotor 110, respectively. Heated cooling fluid 46 exits hydrodynamic chamber 122 through one or more discharge orifices 138 located along a back wall 139 of stator 80 near its outer circumference. Orifice 138 can be fluidly connected to a circumferential annulus 140 formed in housing 112. Annulus 140 can be fluidly connected to a liquid heat generator discharge passage 142. Cooling fluid 46 exiting hydrodynamic chamber 122 through orifice 138 can travel through discharge passage 142 to discharge port 98.

Cooling fluid 46 exits supplemental heating system 92 at port 98 and travels along cabin heat exchanger inlet passage 88a to cabin heat exchanger 86. Heat from cooling fluid 46 can be transferred to airstream 82 as the fluid passes through the heat exchanger. The warm airstream may be directed to passenger compartment 84 to warm the interior of the vehicle.

After passing through cabin heat exchanger 86, cooling fluid 46 exits the heat exchanger and returns to supplemental heating system 92 through cabin heat exchanger discharge passage 90a, which is fluidly connected to supplemental heating system 92 at port 100. Cooling fluid 46 passes through a cabin heater return passage 144 having one end fluidly connected to port 100 and an opposite end fluidly connected to control valve 104. A cooling system return passage 146 fluidly connects control valve 104 to cooling system 40 at port 96, and a liquid heat generator recirculating passage 148 fluidly connects control valve 104 to liquid beat generator 102. Control valve 104 can either direct all or a portion of cooling fluid 46 to recirculating passage 148 or to cooling system return passage 146, depending on the particular heating requirements of heating system 80. Having control valve 104 direct substantially all of the cooling fluid received from cabin heat exchanger 86 to liquid heat generator 102 through recirculating passage 148 results in heating system 80 and cooling system 40 operating substantially independent of one another.

Cooling fluid 46 passing through recirculating passage 148 can be discharged to an annular plenum 150 in housing 112. A second plenum 151 fluidly connects plenum 150 to hydrodynamic chamber 122. Cooling fluid 46 preferably enters hydrodynamic chamber 122 at an inner circumference of the chamber.

Cooling fluid 46 passing through cooling system return passage 146 exits supplemental heating system 92 at port 96. Cooling fluid 46 can travel to water pump 44 through heater exit passage 90, which has one end fluidly connected to the supplemental heating system 92 at port 96, and an opposite end fluidly connected to water pump 44.

Supplemental heating system 92 may include a bypass passage 152 having one end fluidly connected to fluid supply passage 124 and hydrodynamic chamber supply passage 128 at fluid junction 126, and an opposite end fluidly connected to liquid heat generator discharge passage 142 at fluid junction 154. Cooling fluid 46 passing through bypass passage 152 bypasses hydrodynamic chamber 122, and is instead sent directly to cabin heat exchanger 86 without any additional heat being added to the fluid. A check valve 156, or another similar device, may be provided in bypass passage 152 to prevent fluid from flowing backwards through bypass passage 152, from fluid junction 154 to fluid junction 126, when operating liquid heat generator 102. Cooling fluid 46 entering liquid heat generator discharge passage 142 from bypass passage 152 travels to port 98, where the fluid exits supplemental heating system 92.

Control valve 104 controls distribution of cooling fluid 46 between cooling system return passage 146, fluidly connected to heater exit passage 90 at port 96, and liquid beat generator recirculating passage 148, fluidly connected to liquid heat generator 102. Control valve 104 operates to selectively distribute cooling fluid 46 between cooling system return passage 146 and liquid heat generator recirculating passage 148, based on certain preselected parameters. This may include directing all of the cooling fluid received from heat exchanger return passage 144 to either cooling system return passage 146 or liquid heat generator recirculating passage 148, or apportioning the cooling fluid between the two passages. Control valve 104 is preferably infinitely adjustable.

Power for rotateably driving rotor 110 can be supplied by engine 42. An end 158 of drive shaft 114 extends from housing 112 of supplemental heating system 92. Fixedly attached to end 158 is a drive means 160, which may include a sheave 162 engageable with engine accessory drive belt 27. Accessory drive belt 27 engages accessory drive 50 attached to crankshaft 52 of engine 42. Drive belt 27 may also deliver the power required to operate water pump 44, as well as other engine accessories, such as an alternator and air conditioning compressor. Accessory drive belt 27 transfers torque generated by engine 42 to drive shaft 1141, which is connected to rotor 110. It is also contemplated that drive shaft 114 may be alternatively driven by another suitable means, such as an electric motor.

Drive means 160 can include a clutch 164, which may, for example and without limitation, be an electromagnetic clutch. Clutch 164 can be selectively engaged in response to the particular heating requirements of heating system 80. Clutch 164 can be operated to disengage rotor 110 from engine 42 when no additional heating of cooling fluid 46 is required, which may be desirable to minimize the power being drawn from engine 42 for improving engine efficiency and to help maximize the amount of power available for other uses, such as propelling the vehicle.

Hydrodynamic chamber 122 of heat generator 102 may be vented to atmosphere through a vent passage 166. One end of vent passage 166 can be fluidly connected to an annular plenum 168 in housing 112, and an opposite end fluidly connected to a vent exit port 170 located along an exterior surface of housing 112. An expansion tank vent passage 172 can fluidly connect vent passage 166 to expansion tank 78. It is preferable that cooling fluid 46 only partially fill expansion tank 78 to provide an air space 174 within the expansion tank. Expansion tank vent passage 172 is preferably attached to expansion tank 78 at a location adjacent air space 174 to prevent vent passage 172 from being in direct fluid communication with cooling fluid 46 present in expansion tank 72. Stator 108 may include one or more blade vent passages 176 fluidly connecting plenum 168 to hydrodynamic chamber 122. Blade vent passage 176 pass through a center of a stator blade 177 extending from back wall 139 of stator 108.

Controller 106 can be adapted to regulate operation of liquid heat generator 102 and control valve 104. Controller 106 may be, by way of example and without limitation, a programmable microprocessor. Controller 106 is operably connected to control valve 104 by means of a connector 178. Controller 106 can send a control signal to control valve 104 for controlling operation of control valve 104 and regulating distribution of the cooling fluid between cooling system return passage 146 and liquid heat generator recirculating passage 148.

Controller 106 may be adapted to control operation of clutch 164, which is operably connected to control unit 106 by means of a connector 179. Controller 106 can send a control signal to clutch 164 instructing the clutch to either engage or disengage depending on the heating requirements of heating system 80. Engaging clutch 164 enables torque from engine 42 to be applied to shaft 114 through drive belt 27, thereby causing rotor 110 to rotate about axis 116 and heat cooling fluid 46 present in hydrodynamic chamber 122. Disengaging clutch 164 decouples shaft 114 and rotor 110 from engine 42. With clutch 164 disengaged, liquid heat generator 102 does not produce any heat since rotor 110 is not being rotateably driven by belt 27.

Controller 106 may be adapted to monitor various operating parameters of supplemental heating system 92, including by way of example and without limitation, the rotational speed of rotor 110, a temperature of cooling fluid 46 entering liquid heat generator 102 through liquid heat generator recirculating passage 148, and the pressure level of cooling fluid 46 exiting liquid heat generator 102 through liquid heat generator discharge passage 142. The rotational speed of rotor 110 may be monitored by means of a speed pickup 180, which may include any of variety of known speed pickup devices, for example and without limitation, an electromagnetic pickup. An electromagnetic pickup may include a magnetized material suitably attached to a back wall 182 of rotor 110. A sensor 184 adapted to detect the magnetic field of the magnetized material attached to rotor 10 can be suitably attached to housing 112. A connector 186 operably connects speed pickup 180 to controller 106. It is also contemplated that electromagnetic pickup 180 may be suitably mounted to various other locations, by way of example without limitation, drive means 106.

The temperature of cooling fluid 46 entering liquid heat generator 102 through liquid heat generator recirculating passage 148 may be monitored by means of a temperature probe 188, which may include any of a variety of known temperature sensing devices, for example and without limitation, a thermocouple and a resistance temperature detector. Temperature probe 188 can be suitably located within liquid heat generator recirculating passage 148, or another suitable location, which enables temperature probe 188 to detect a temperature of cooling fluid 46 passing through the passage. A conventional connector 190 operably connects temperature probe 188 to controller 106. Temperature probe 188 can be adapted to produce a signal indicative of the temperature of the cooling fluid present in the passage.

The pressure of cooling fluid 46 exiting liquid heat generator 102 through liquid heat generator discharge passage 142 can be monitored by means of a pressure probe 192, which may include any of a variety of known pressure sensing devices. Pressure probe 192 is preferably located within liquid heat generator discharge passage 142 near discharge orifice 138, or another suitable location, which enables pressure probe 192 to detect the pressure of cooling fluid 46 exiting hydrodynamic chamber 122. Pressure probe 192 can be adapted to generate a signal indicative of the pressure of the cooling fluid passing through discharge passage 142. A connector 194 operably connects pressure probe 192 to controller 106.

Referring also to FIGS. 4-7, the various components of supplemental heating system 92 may be conveniently packaged as a unitized assembly for installation in the vehicle. Attached to housing 112, using one or more fasteners 196, is a fluid distribution module 198. Fasteners 196 are engageable with a threaded aperture 199 in housing 112. Alternatively, it is contemplated that fluid distribution module 198 may be positioned remotely from housing 112, which may require additional fluid passages to fluidly connect the module to liquid heat generator 102.

Fluid distribution module 198 includes a manifold 200 for distributing cooling fluid 46 between supplemental heating system 92, engine cooling system 40, and cabin heat exchanger 86. Attached to manifold 200 is control valve 104, which operates to control distribution of cooling fluid received through cabin heat exchanger return passage 144, between cooling system return passage 146 and liquid heat generator recirculating passage 148. Fluid distribution module 198 may include one or more external connectors for fluidly connecting supplemental heating system 92 to engine cooling system 40 and heating system 80. Supplemental heating system 92 can be retrofitted to an existing vehicle, or incorporated as original equipment on a newly manufactured vehicle, by fluidly connecting heater inlet passage 88 and heater exit passage 90 to ports 94 and 96, respectively, of supplemental heating system 92. Similarly, cabin heat exchanger 86 can be fluidly connected to supplemental heating system 92 by connecting cabin heat exchanger inlet passage 88a and discharge passage 90a to ports 98 and 100, respectively.

Referring also to FIGS. 8 through 13, manifold 200 includes a generally cylindrically shaped hollow cavity 202 extending partially through the manifold. Cavity 202 has an open end 204 accessible from outside manifold 200, and a partially closed end 205 opposite open end 204. An inner diameter of cavity 202 is substantially constant over approximately the first half the cavity's length starting at open end 204. Approximately midway along the length of cavity 202, the inner diameter steps down to a second smaller diameter, creating a shoulder 206 intermediate the two ends of cavity 202.

Fluidly connected to cavity 202 adjacent partially closed end 205, is cabin heat exchanger return passage 144. Cabin heat exchanger return passage 144 can be fluidly connected to port 100. Port 100 may have an elongated cylindrical shape adapted to receive an end of cabin heat exchanger discharge passage 90a. Also fluidly connected to partially closed end 205 of cavity 202 is cooling system return passage 146. Cooling system return passage 146 terminates at port 96. Port 96 may have an elongated cylindrical shape adapted to receive an end of heater discharge passage 90a. Liquid heat generator recirculating passage 148 fluidly connects to a generally middle region of cavity 202.

Fluid distribution module 198 may include a generally cup shaped control valve mounting sleeve 210 having an open first end 212 and a partially closed second end 214 disposed within cavity 202 of manifold 200. An outer surface of mounting sleeve 210 can be stepped to correspond to the stepped profile of cavity 202. An O-ring 218 can be disposed in an annular cavity 220 formed between the inner surface of cavity 202 and the outer surface of mounting sleeve 210.

A radial flange 220 extends outward from end 212 of mounting sleeve 210. Flange 220 abuts an outer surface 221 of manifold 200 when mounting sleeve 210 is fully inserted in cavity 202. An aperture 222 formed in end 214 of mounting sleeve 210 fluidly connects an inner region 224 of mounting sleeve 210 to cooling system return passage 146. One or more orifices 226 extend through a sidewall 228 of mounting sleeve 210 adjacent end 214. Orifices 226 fluidly connect heat exchanger return passage 144 to the inner region 224 of mounting sleeve 210. A second orifice 229, for fluidly connecting inner region 224 of mounting sleeve 210 to liquid heat generator recirculating passage 148, traverses sidewall 228 of mounting sleeve 210 intermediate the first and second ends. A recessed slot 230 extends circumferentially along an inner bore 234 of mounting sleeve sidewall 228, and is generally aligned axially to coincide with orifice 229.

Figure 14:
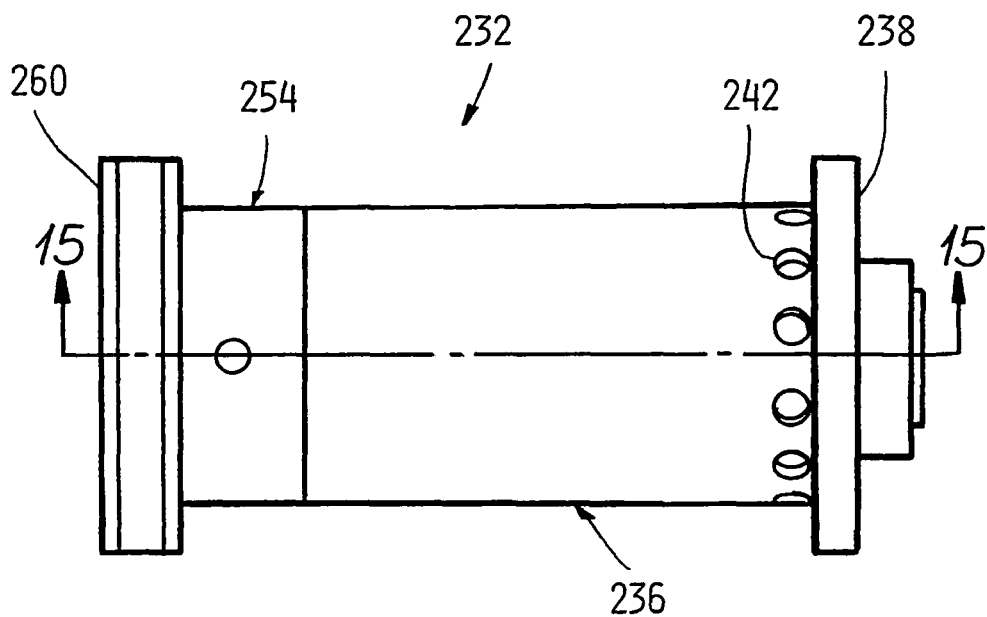
FIG. 14 is a side elevational view of the spool valve deployed in the supplemental heating system, shown fully retracted.
Figure 16:
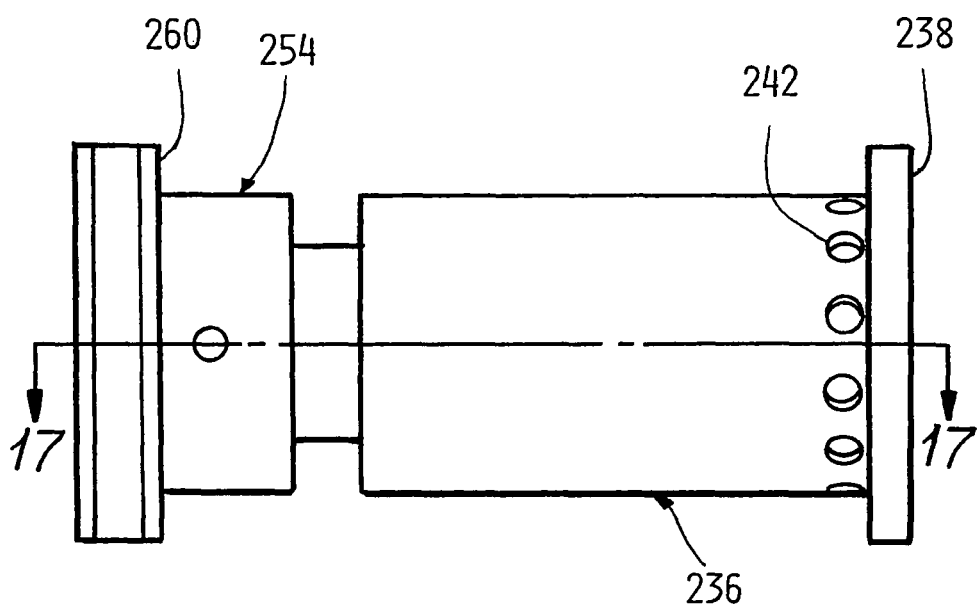
FIG. 16 is a side elevational view of the spool of the fluid distribution module, shown fully expanded.
Figure 15:
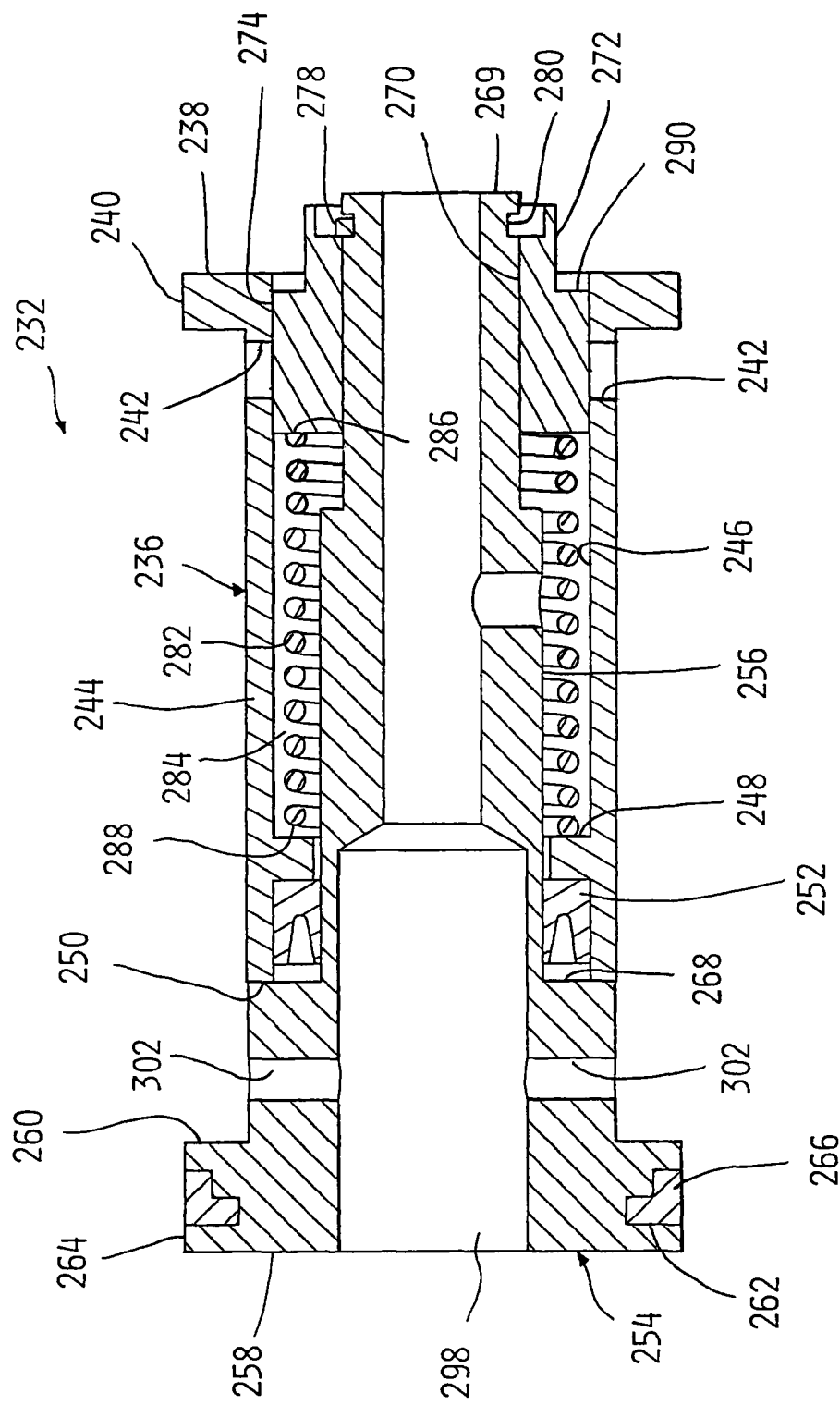
FIG. 15 is a cross-sectional view of the spool valve of FIG. 14, taken along section 15-15.
Figure 17:
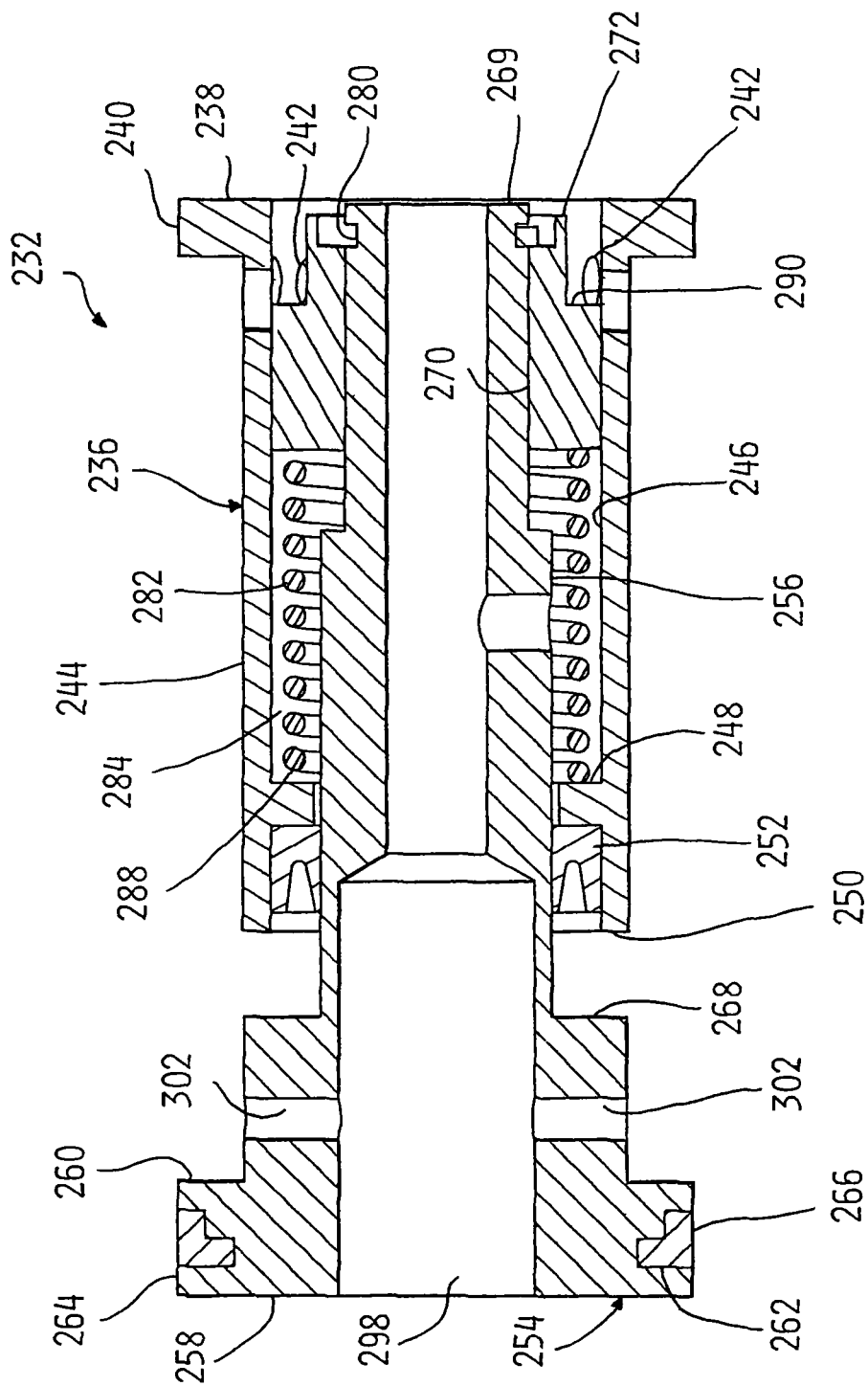
FIG. 17 is a cross-sectional view of the spool of FIG. 16, taken along section 17-17.
Figure 18:
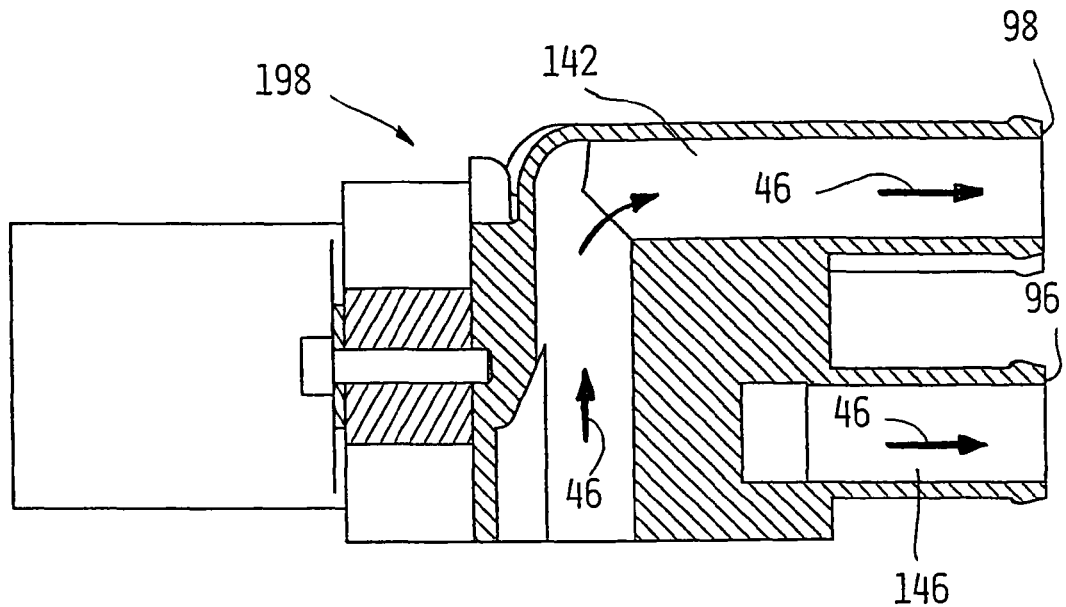
FIG. 18 is a cross-sectional view of the fluid distribution module taken along section 18-18 of FIG. 5.
Figure 19:
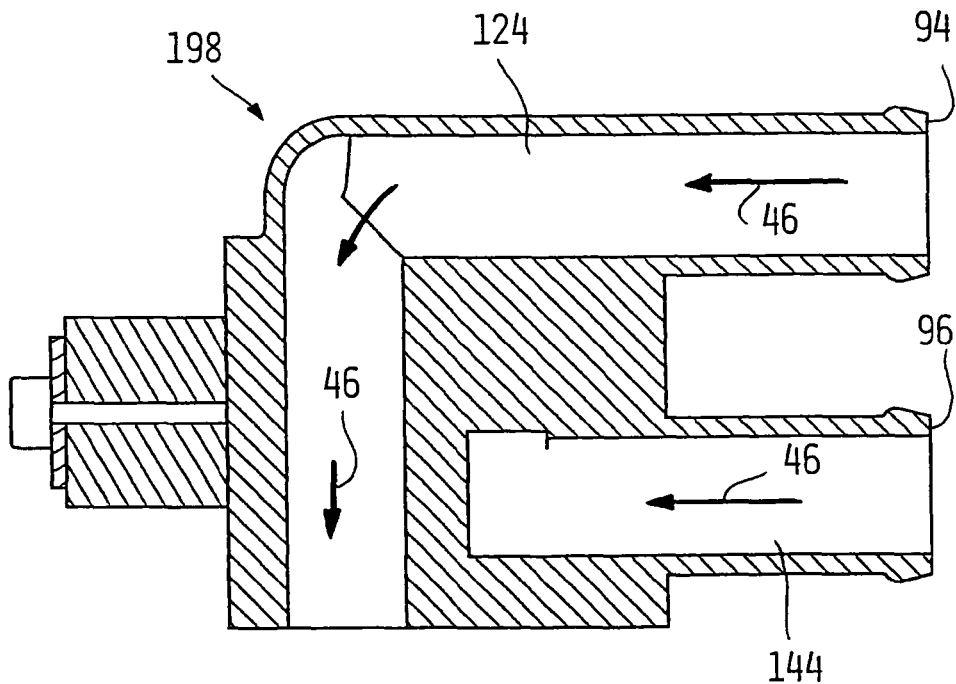
FIG. 19 is a cross-sectional view of the fluid distribution module taken along section 19-19 of FIG. 5.

Referring also to FIGS. 14 through 16, control valve 104 includes a cylindrically shaped spool 232 slideably disposed within bore 234 of a mounting sleeve 210. Spool 232 includes a hollow cylindrically shaped bypass piston 236. Extending radially outward from one end of bypass piston 236 is an outer flange 238. An outer circumference 240 of the flange slideably engages bore 234 of mounting sleeve 210. One or more orifices 242 extending through a sidewall 244 of bypass piston 236 are located adjacent flange 238. The orifices enable cooling fluid to pass between the inner and outer regions of bypass piston 236.

Extending radially inward from an inner surface 246 of sidewall 244 is an inner flange 248. Flange 248 is displaced inward of an end 250 of bypass piston 236 opposite flange 238. A shaft seal 252 may be internally disposed within end 250 of bypass piston 236, and abuts inner flange 248.

Spool 232 may also include a cylindrically shaped modulating piston 254 having an end section 256 partially disposed within bypass piston 236. Extending radially outward from an end 258 of modulating piston 254, opposite outer flange 238 of bypass piston 236, is a flange 260. Flange 260 may include a circumferential notch 262 extending along an outer circumference 264 of the flange. A seal material 266 may be disposed within notch 262. Seal 266 can slideably engage bore 234 of mounting sleeve 210. End section 256 of modulating piston 254, opposite flange 260, can be necked down to allow the modulating piston to be partially disposed within bypass piston 236. The necked down region forms a shoulder 268, against which end 250 of bypass piston 236 can abut when end section 256 of modulating piston 254 is fully inserted into bypass piston 236. An inner circumference of seal 252 can slideably engage an outer surface of necked down region 256 of modulation piston 254.

An end 269 of modulating piston 254, opposite flange 260, engages a bore 270 of a ring shaped retaining block 272. An outer circumference 274 of retaining block 272 slideably engages inner surface 246 of bypass piston 236. Retaining block 272 can be affixed to an end of modulating piston 254 by means of a retaining ring 278. Retaining ring 278 can engage a circumferential notch 280 formed in end 269 of modulating piston 254.

Bypass piston 236 and modulating piston 254 are free to move axially relative to one another. A biasing member 282 can be disposed within an annular space 284 formed between bypass piston 236 and modulating piston 254. Biasing member 282 urges bypass piston 236 and modulating piston toward one another, such that end 250 of bypass piston 236 contacts shoulder 268 of modulating piston 254. Biasing member 282 may be a coil spring, or another similar device, including but not limited to, an elastic cylinder or a leaf spring. One end 286 of the biasing member engages retaining block 272 and an opposite end 288 engages inner flange 248 of bypass piston 236.

Spool 232 is in a fully compressed state when end 250 of bypass piston 236 contacts shoulder 268 of modulating piston 254. Spool 232 can be expanded by applying outwardly opposing forces to flange 238 of bypass piston 236 and flange 260 of modulating piston 245 sufficient to overcome the spring rate of biasing member 282. The opposing forces tend to cause end 250 of bypass piston 236 to move away from shoulder 268 of modulating piston 254, thereby causing spool 232 to expand.

With spool 232 fully compressed, such that end 250 of bypass piston 236 contacts shoulder 268 of modulating piston 254, retaining block 272 is axially aligned with orifices 242 in bypass piston 236, which will substantially prevent cooling fluid from flowing through orifices 242. Spool 232 can be sufficiently expanded (i.e., increasing the distance between bypass flange 238 and modulating flange 260) to allow an end 290 of retaining block 272 to clear orifices 242, which will enable cooling fluid pass through the orifices.

Axial movement of spool 232 within bore 234 of mounting sleeve 210 can be controlled by an actuator 292, which may include, for example and without limitation, a solenoid or piezo-electric actuator. Actuator 292 may include a movable drive link 294 extending from and end 296 of the actuator. An end of drive link 294 can engage a receiving passage 298 formed in end 258 of modulating piston 254. Drive link 294 can be attached to modulating piston 254 by means of a roll pin 300, which engages a pair of radially extending apertures 302 in modulating piston 254, and a corresponding aperture 303 extending through drive link 294. Alternatively, it is also contemplated that other suitable connecting devices, including but not limited to screws, rivets and bolts, may also be used to secure spool 232 to drive link 294. End 296 of actuator 292 may include a boss 302 that is engageable with bore 234 of mounting sleeve 210, which may assist in obtaining proper alignment of the actuator relative to mounting sleeve 210. Actuator 292 and mounting sleeve 210 may be attached to manifold 200 using one or more bolts 304 that simultaneously extend through apertures in a flange 306 of actuator 292 and flange 220 of mounting sleeve 210, and which threadably engage a corresponding aperture in manifold 200. Alternatively, it is also contemplated that another suitable attaching means, for example and without limitation, screws and rivets, may also be used to attach mounting sleeve 210 and actuator 292 to manifold 200.

Actuator 292 is operable to selectively position spool 232 at a desired location within bore 234 of mounting sleeve 210. Actuator 292 may be operably connected to controller 106, which may be adapted to control operation of the actuator.

Supplemental heating system 92 may be operated in various modes depending on the heating requirement of heating system 80. For example and without limitation, a bypass mode, wherein cooling fluid 46 received from cabin heat exchanger 86 is returned to engine cooling system 40, and a dedicated mode, wherein cooling fluid from cabin heat exchanger 86 is recirculated back to liquid heat generator 102.

Figure 8:
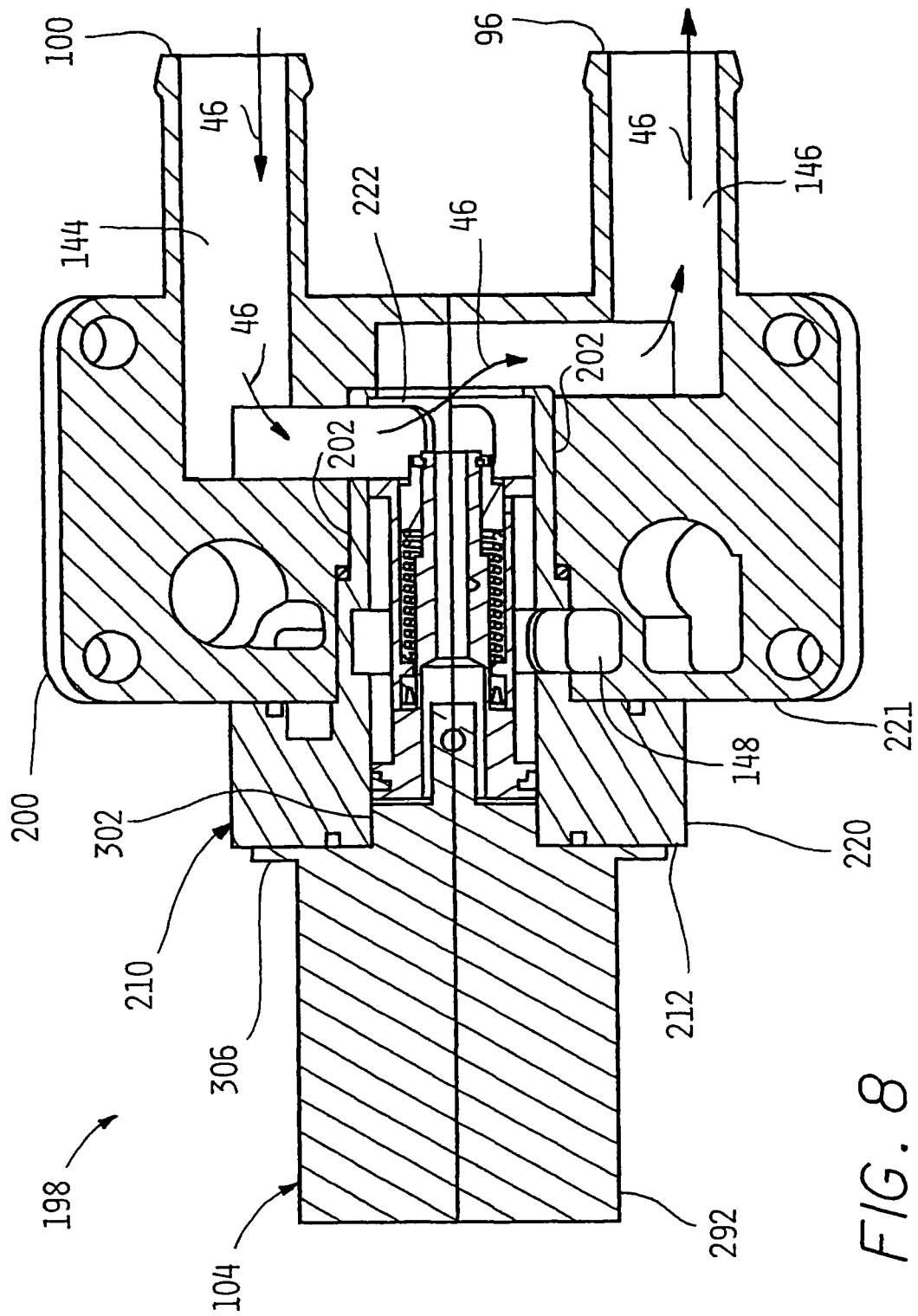
FIG. 8 is a cross-sectional view of the fluid distribution module taken along section 8-8 of FIG. 7, showing a spool valve located in a bypass mode position.
Figure 9:
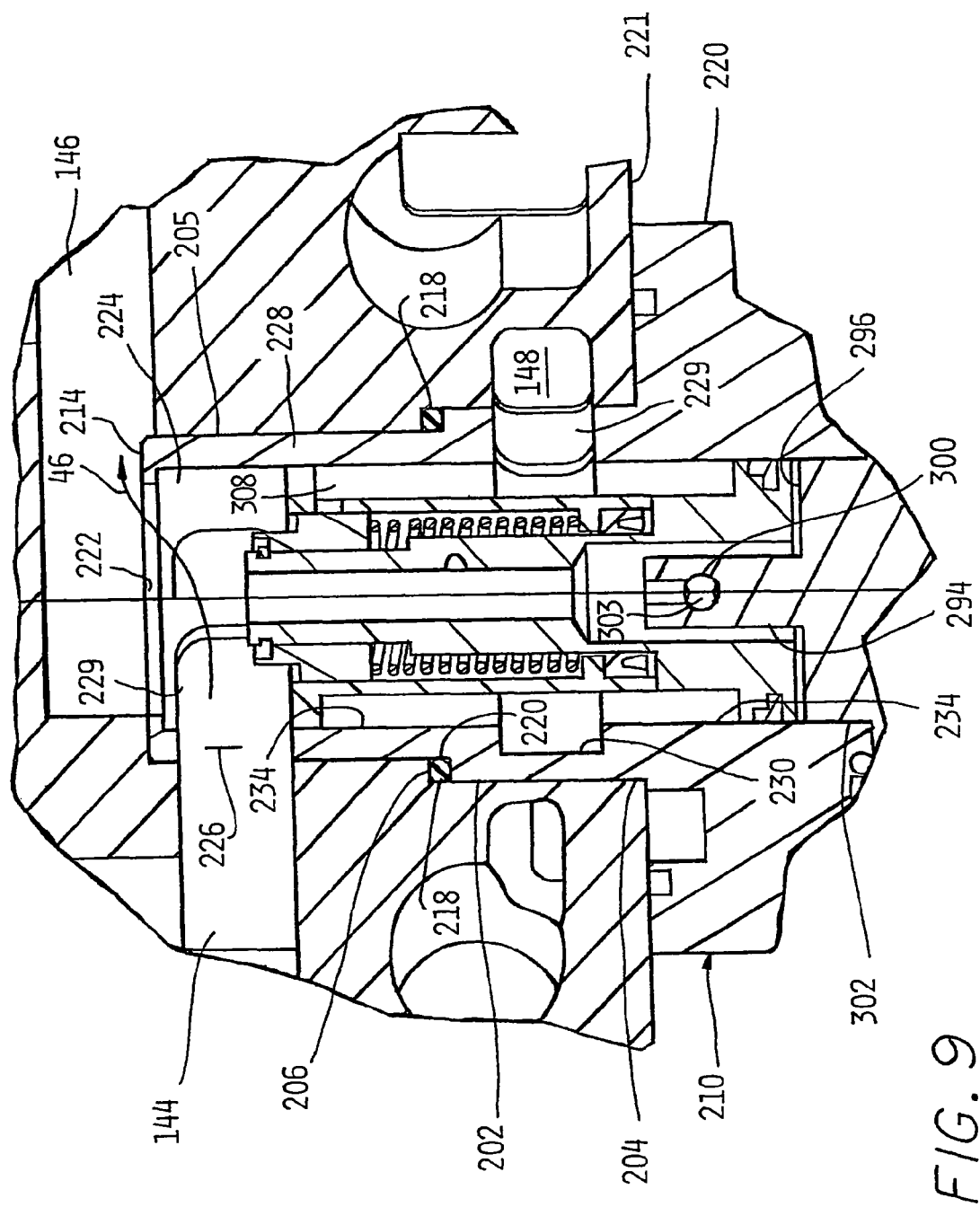
FIG. 9 is a partial cross-sectional view of the fluid distribution module of FIG. 8 showing details of the spool valve.

When operating in the bypass mode, actuator 292 can be activated to slide spool 232 toward the actuator and away from aperture 222 in end wall 214 of mounting sleeve 210, as shown in FIGS. 8 and 9. This opens the fluid path between fluid passages 144 and 146, thereby enabling cooling fluid 46 to be directed back to cooling system 40, while at the same time closing the fluid path between fluid passages 144 and 148. Liquid heat generator 92 may or may not be operating, depending on the particular heating requirements of the vehicle. For example, if supplemental heating system 92 is primarily used to provide additional heat to the vehicle cabin, liquid heat generator 92 will generally be deactivated when spool 232 is located in the bypass position. Liquid heat generator 92 can be deactivated by disengaging clutch 164, which decouples rotor 110 from engine accessory drive 50. Fluid entering supplemental heating system 92 at port 94 will pass through supply passage 124 to fluid junction 126. A majority of the cooling fluid arriving at fluid junction 126 will proceed to pass through bypass passage 152 and check valve 156. The cooling fluid will continue to flow to fluid junction 154, where it can be discharged to liquid heat generator discharge passage 142. Cooling fluid 42 exits supplemental heating system 92 at port 98 and can be directed to cabin heat exchanger 86 through cabin heat exchanger inlet passage 88*a*. After passing through heat exchanger 86, the cooling fluid is directed back to supplemental heating system 92 through cabin heat exchanger discharge passage 90*a*. Cooling fluid entering supplement heating system 92 at port 100 can travel through cabin heat exchanger return passage 144 to control valve 104. Since spool 232 is positioned in the bypass position, fluid from cabin heat exchanger return passage 144 will pass through orifices 226 in mounting sleeve 210, and into interior cavity region 224 of mounting sleeve 210. From there, cooling fluid 46 may flow through aperture 222 in end wall 214 of mounting sleeve 210 to cooling system return passage 146.

With liquid heat generator 102 deactivated, a relatively small amount of cooling fluid 46 passing through supply passage 124 may nevertheless flow through hydrodynamic chamber supply passage 128 to hydrodynamic chamber 122. The vast majority of fluid, however, will flow through bypass passage 152. The small amount of cooling fluid entering hydrodynamic chamber 122 will be discharged to expansion tank 78 through vent passage 166 and expansion tank vent passage 172.

It may be desirable to operate liquid heat generator 102 with spool 232 positioned in the bypass position, for example, following an engine cold start to accelerate warming of the engine. With liquid heat generator 102 activated, cooling fluid arriving at fluid junction 126 will proceed to flow through hydrodynamic chamber supply passage 128 to hydrodynamic chamber 122, rather than through bypass passage 152. Heated cooling fluid 46 can flow from hydrodynamic chamber 122 to liquid heat generator discharge passage 142. From that point, the cooling fluid follows the same path as when the liquid heat generator is not operating, passing through cabin heat exchanger 86 and onto control valve 104, which is set to direct the cooling fluid back to engine cooling system 40 through cooling system return passage 146.

Figure 10:
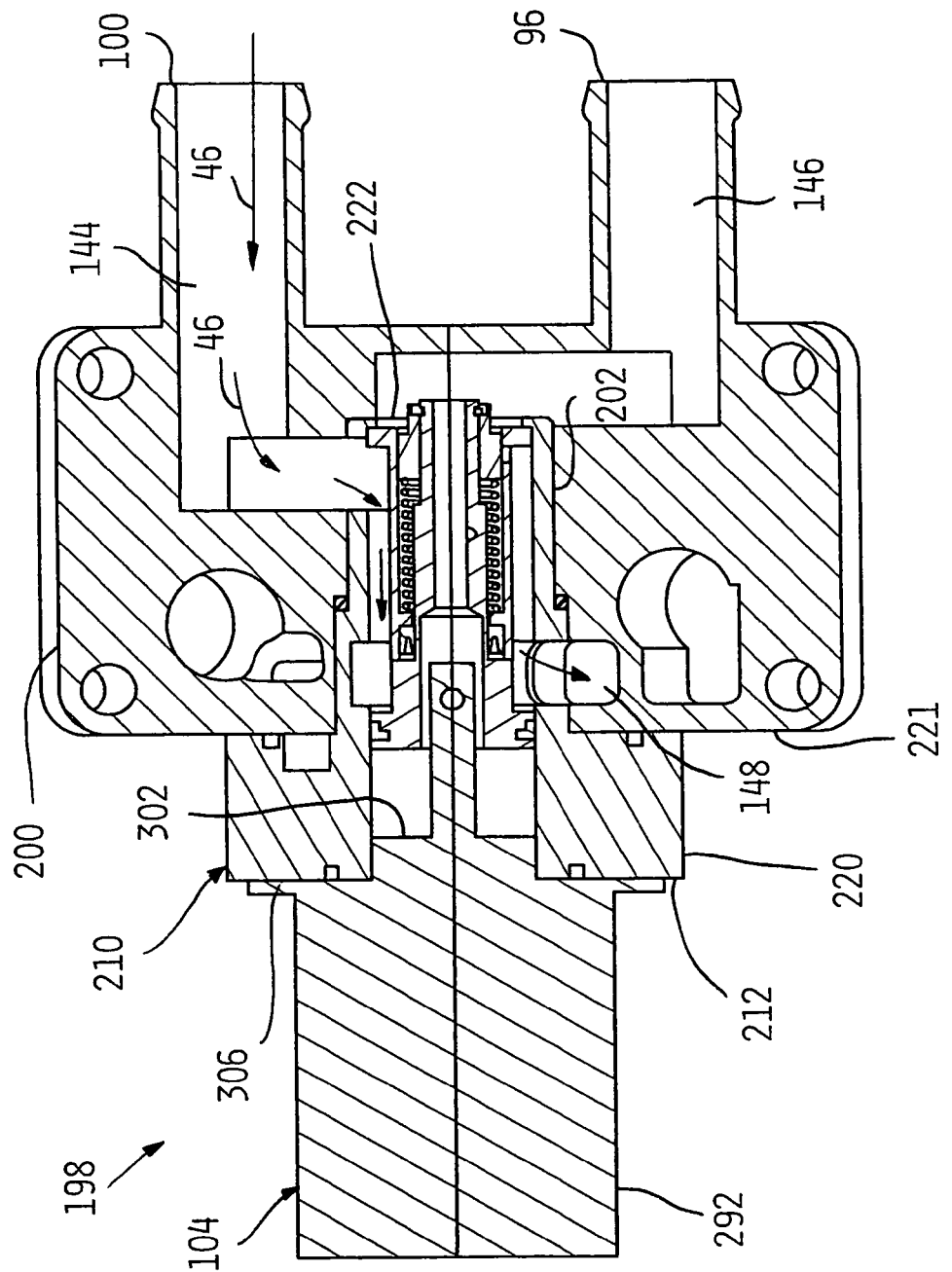
FIG. 10 is a cross-sectional view of the fluid distribution module taken along section 8-8 of FIG. 7, showing a spool valve located in a dedicated mode position.
Figure 11:
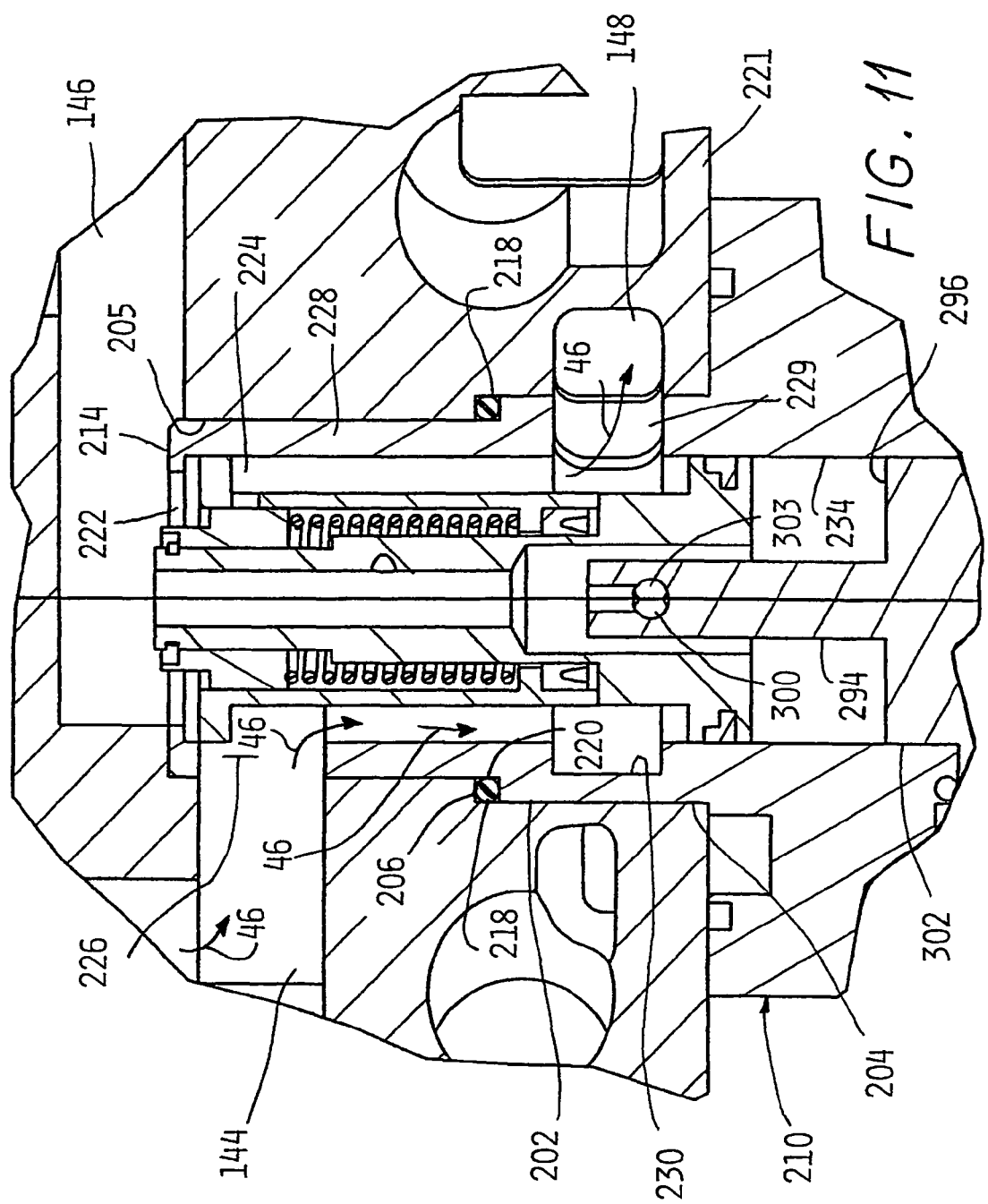
FIG. 11 is a partial cross-sectional view of the fluid distribution module of FIG. 10 showing details of the spool valve.

When operating supplemental heating system 92 in the dedicated mode, actuator 292 can be activated to slide spool 232 away from the actuator and toward aperture 222 in end wall 214 of mounting sleeve 210, such that flange 238 of bypass piston 236 engages end wall 214 of the mounting sleeve, as shown in FIGS. 10 and 11. This opens the fluid path between fluid passages 144 and 148, thereby enabling cooling fluid 46 to be directed back to liquid heat generator 102, while at the same time closing the fluid path between fluid passages 144 and 146. Cooling fluid is prevented from entering cooling system return passage 146 when operating the supplemental heating system in the dedicated mode.

The dedicated mode can be initiated by engaging clutch 164 to activate liquid heat generator 102, causing rotor 110 to rotate about axis 116. Control valve 104 is preferably positioned in the bypass position when clutch 164 is first engaged, and is thereafter moved to the dedicated position. Cooling fluid 46 entering supplemental heating system 92 through port 94 flows along coolant supply passage 124 to fluid junction 126. Rather than entering bypass passage 152, as is the case when operating in the bypass mode, the cooling fluid flows through hydrodynamic chamber supply passage 128 to hydrodynamic chamber 122. The cooling fluid follows the previously described path through liquid heat generator 102, exiting hydrodynamic chamber 122 at discharge port 138. Heated cooling fluid 46 travels through liquid heat generator discharge passage 142 to port 98, where the fluid exits supplemental heating system 92. From port 98, cooling fluid 46 travels through cabin heat exchanger inlet passage 88a to cabin heat exchanger 86, where a portion of the fluid heat can be transferred to airstream 82. Upon exiting cabin heat exchanger 86, the cooling fluid is directed back to supplemental heating system 92 through cabin heat exchanger discharge passage 90a, where it reenters supplemental heating system 92 at port 100. Cooling fluid 46 passes through heat exchanger return passage 144 to control valve 104. With control valve 104 positioned in the dedicated position, cooling fluid is blocked from flowing through aperture 222 to cooling system return passage 146, and instead is directed back to liquid heat generator 102 through liquid heat generator recirculating passage 148. Cooling fluid from return passage 144 passes through orifices 226 traversing sidewall 228 of the mounting sleeve, and flows around the outer circumference of bypass piston 236. Cooling fluid 46 passes through orifices 229 traversing the sidewall of the mounting sleeve, and into liquid heat generator recirculating passage 148, which directs the cooling fluid back to liquid heat generator 102.

Figure 12:
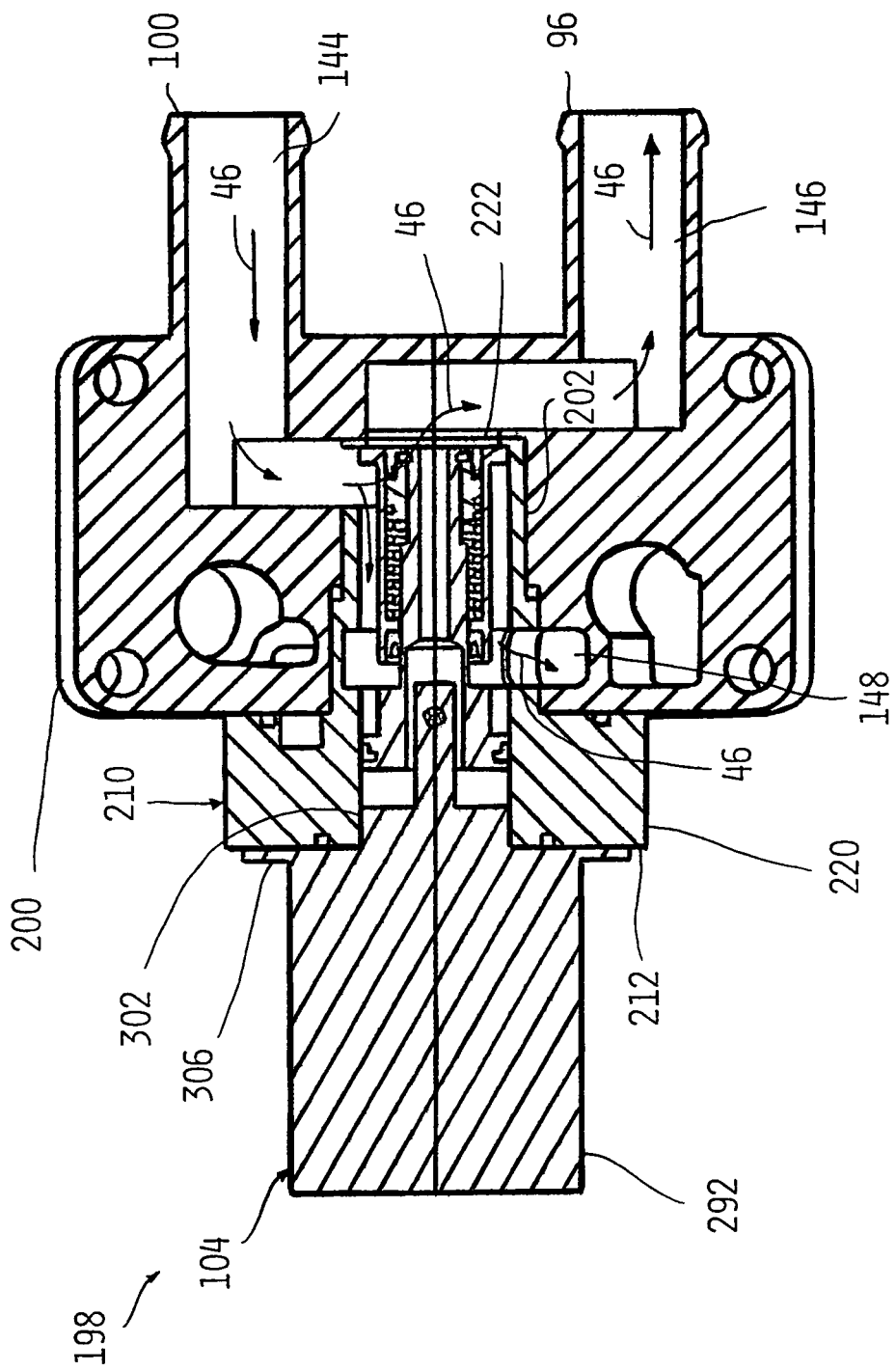
FIG. 12 is a cross-sectional view of the fluid distribution module taken along section 8-8 of FIG. 7, showing a spool valve located in a dedicated mode with modulation.
Figure 13:
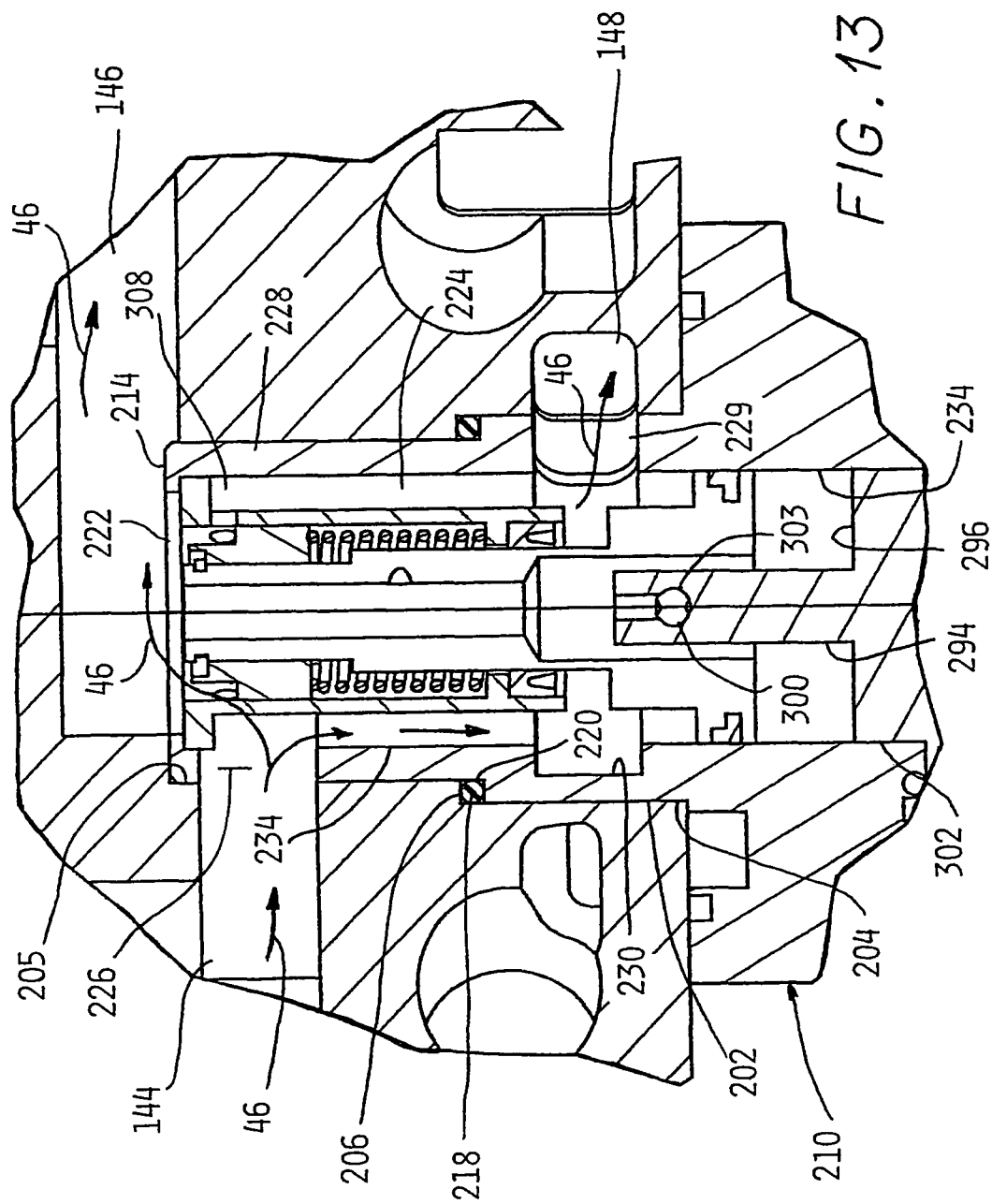
FIG. 13 is a partial cross-sectional view of the fluid distribution module of FIG. 12 showing details of the spool valve.

To avoid over pressurizing hydrodynamic chamber 122 when operating in the dedicated mode, spool 232 is operable to enable a portion of cooling fluid received from heat exchanger return passage 144 to be directed to cooling system return passage 146, which transfers the cooling fluid back to engine cooling system 40, as shown in FIGS. 12 and 13. Directing a portion of the cooling fluid to passage 146 may cause a corresponding drop in pressure within hydrodynamic chamber 122. The pressure level within hydrodynamic chamber 122 can be approximated by monitoring the pressure level within liquid heat generator discharge passage 142 by means of pressure gage 192. As the pressure level within hydrodynamic chamber 122 increases, so does the pressure level within annular cavity 308 between spool 232 and mounting sleeve 210. Increasing the pressure within annular cavity 308 beyond a predetermined level will cause modulating piston 254 to move away from bypass piston 236, and at least partially unblock orifices 242 in bypass piston 236, thereby enabling cooling fluid to flow through the orifices from heat exchanger return passage 144 to cooling system return passage 146. Bleeding off of small portion of cooling fluid in this way may cause a corresponding drop in pressure within hydrodynamic chamber 122. As the pressure level within hydrodynamic chamber 122 decreases, modulating piston 254 and bypass piston 236 move toward one another, causing retaining sleeve 272 to block the flow of coolant from return passage 144 to cooling system return passage 146.

Figure 20:
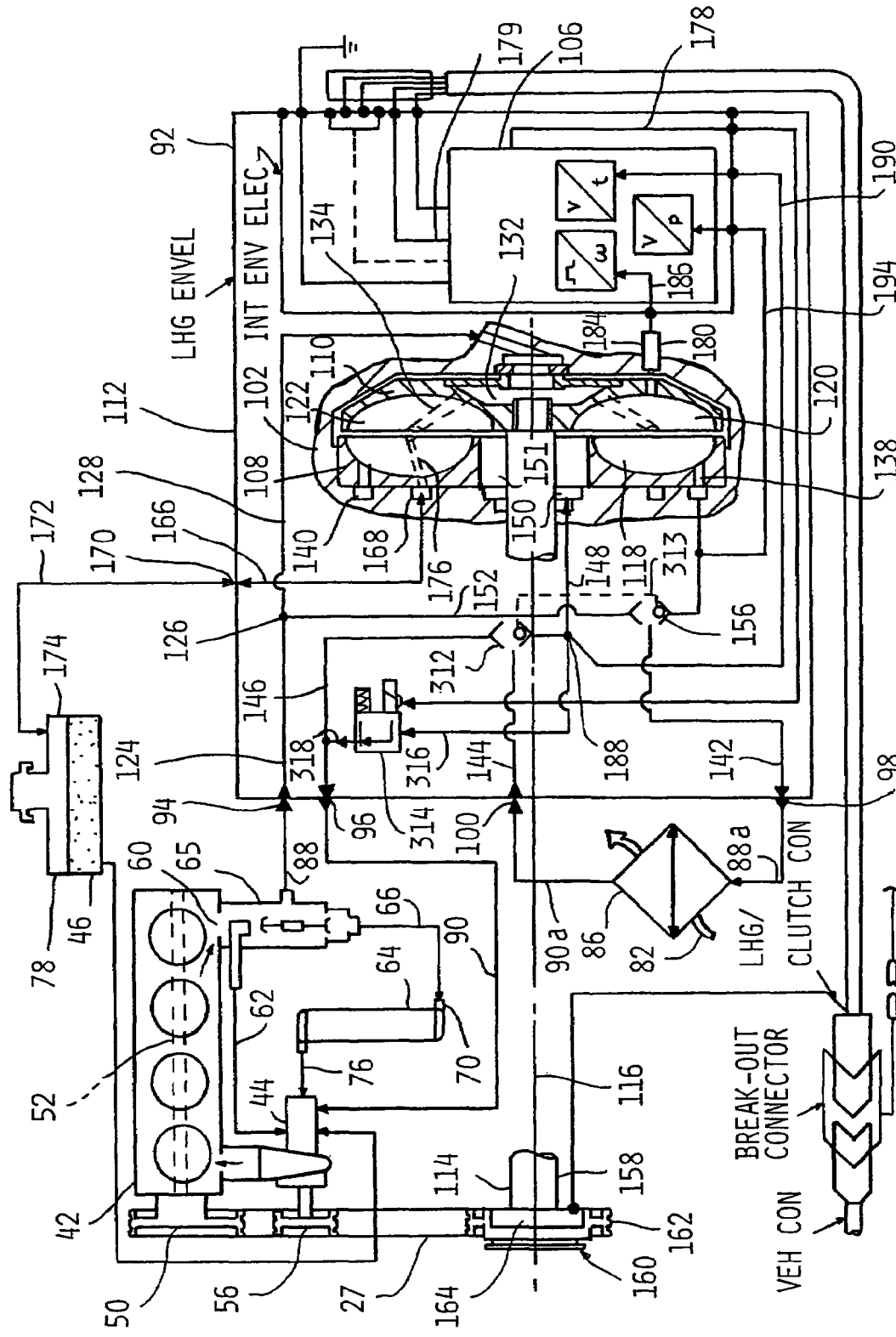
FIG. 20 is a schematic depiction of a supplemental heating system incorporating a dual check valve fluid distribution module for controlling distribution of cooling fluid within the system.
Figure 21:
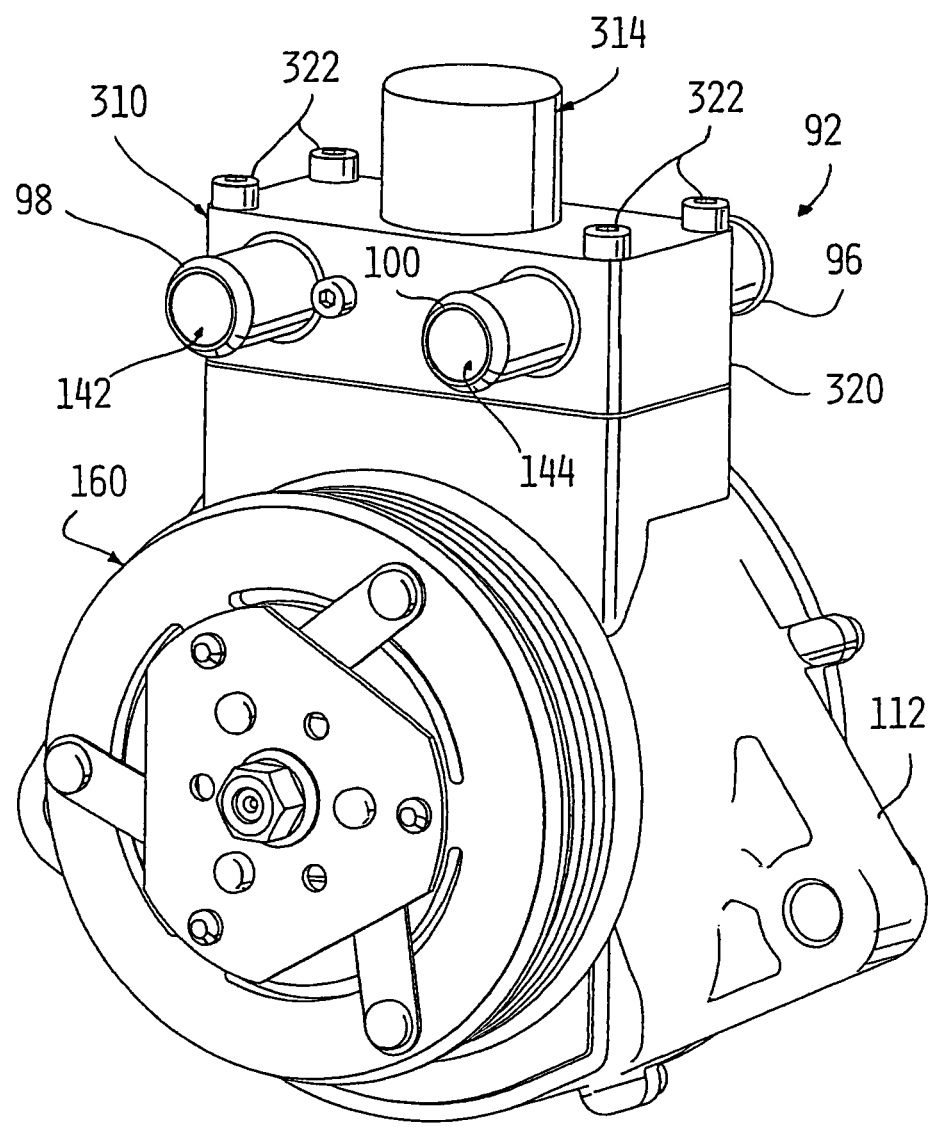
FIG. 21 is a front perspective view of the supplemental heating system deploying the dual check valve fluid distribution module.
Figure 22:
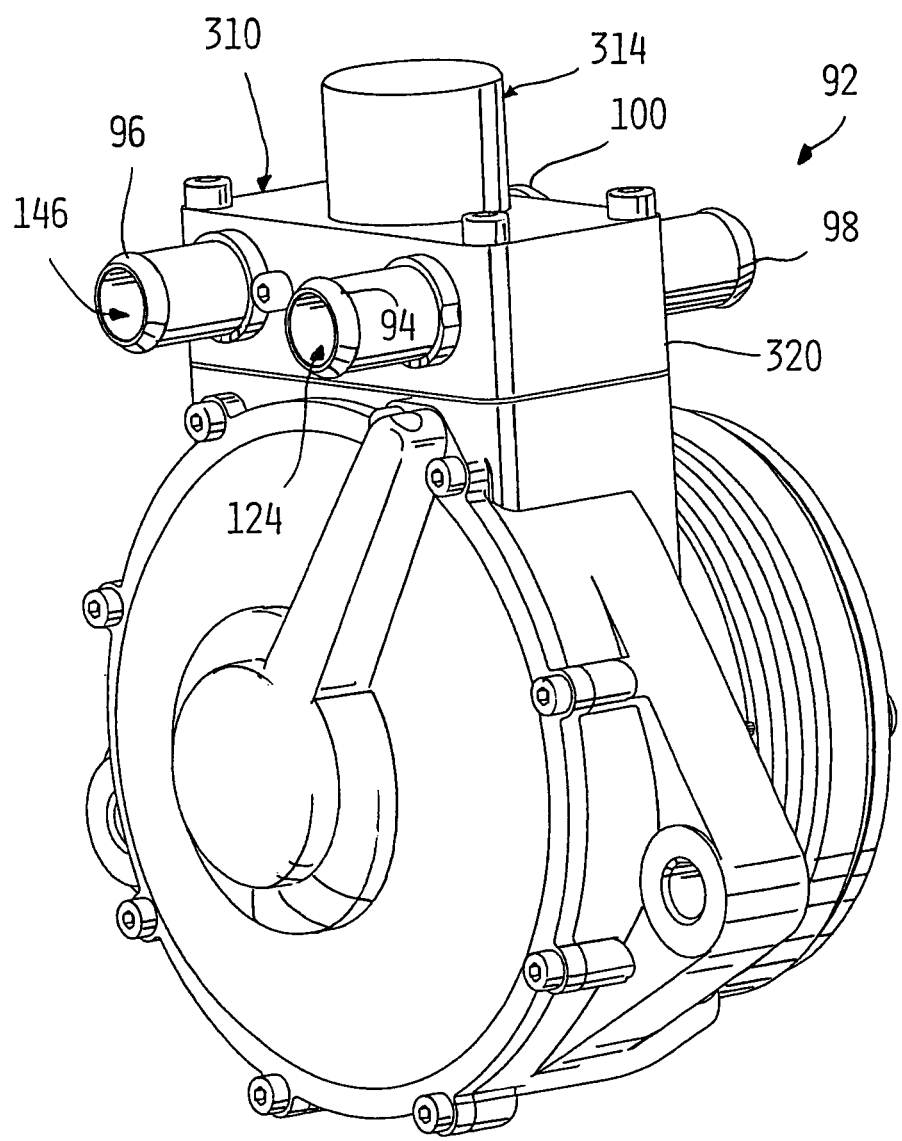
FIG. 22 is a rear perspective view of the supplemental heating system deploying the dual check valve fluid distribution module.
Figure 23:
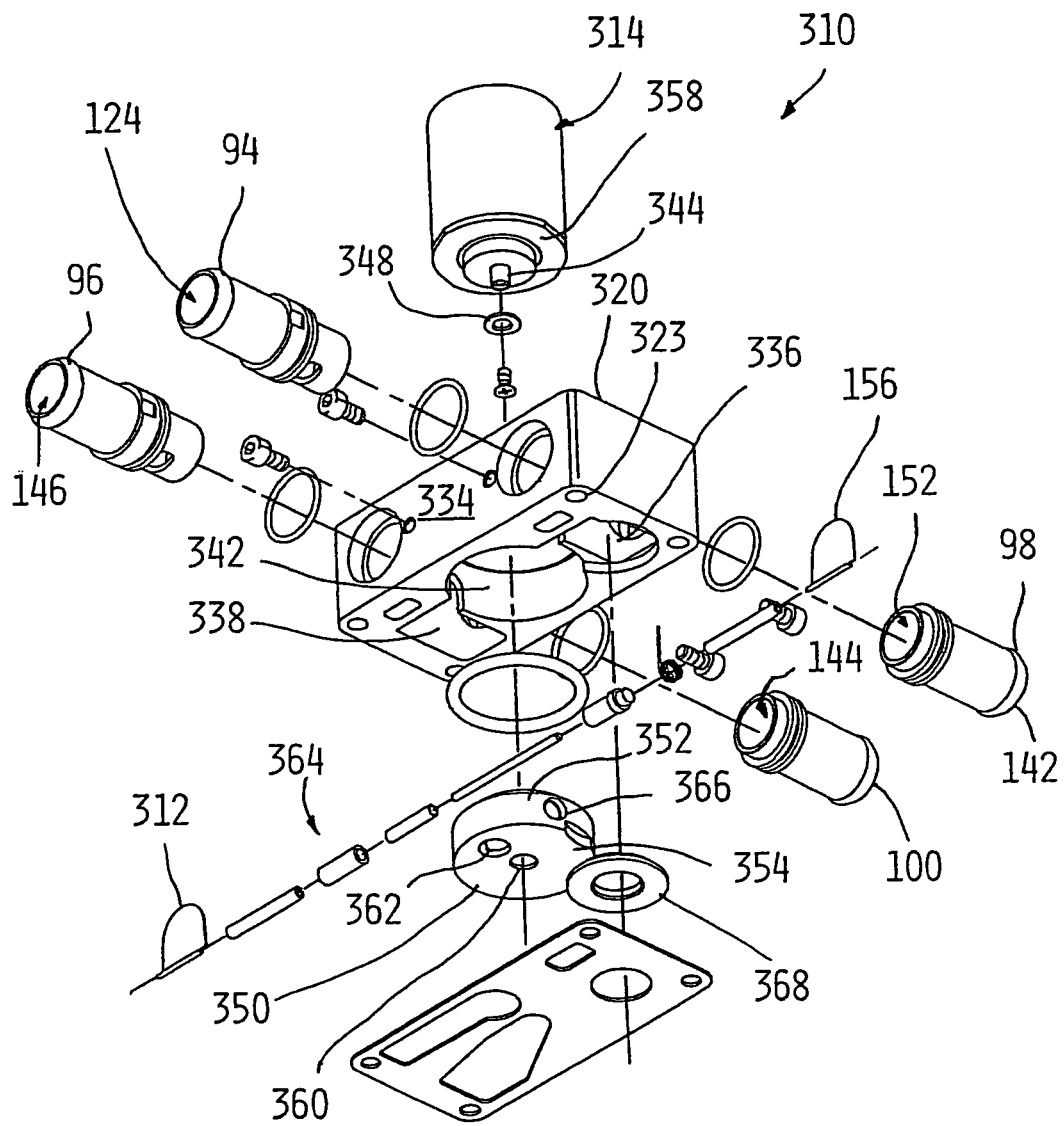
FIG. 23 is an exploded rear perspective view of the dual check valve fluid distribution module.
Figure 24:
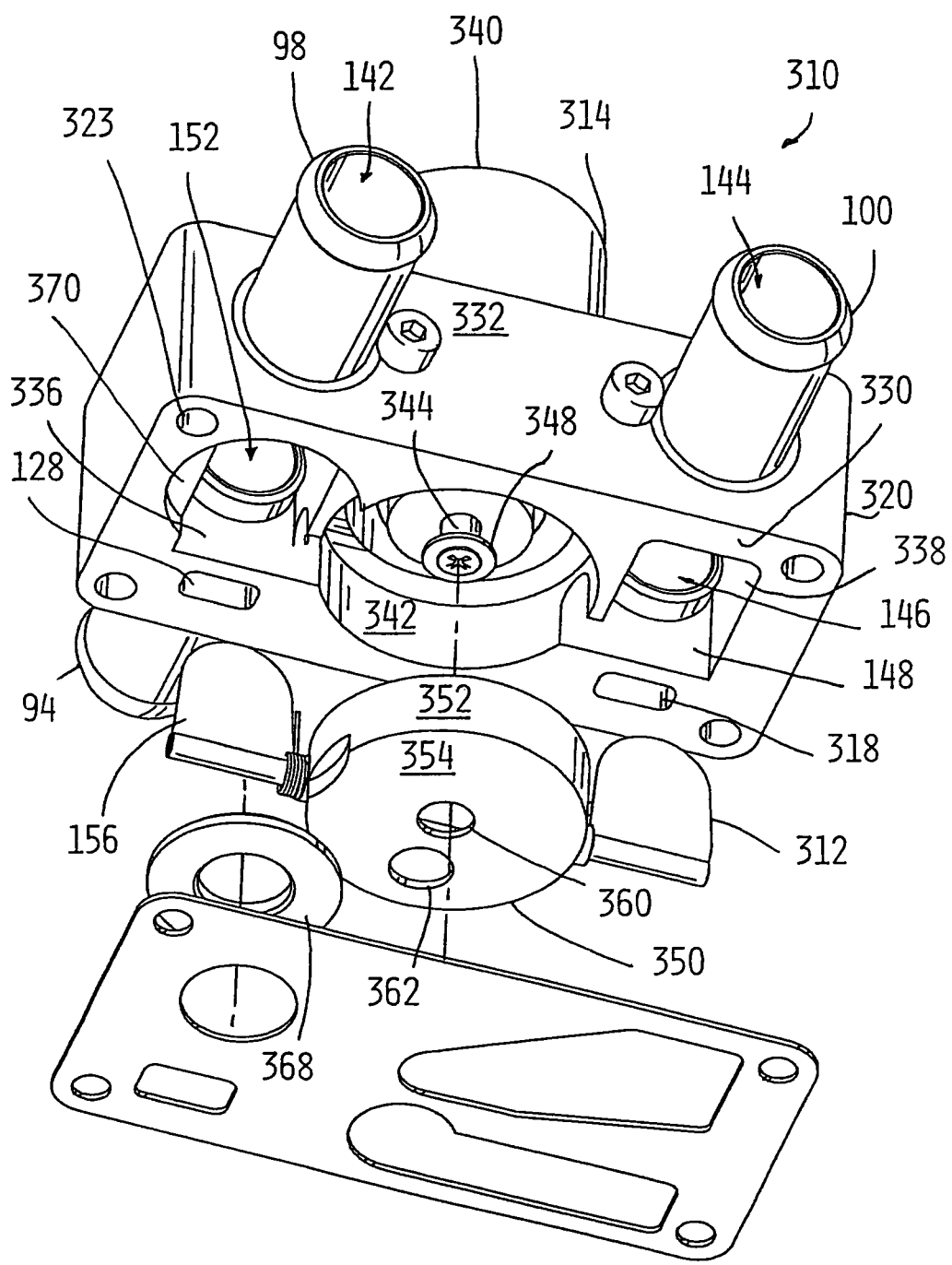
FIG. 24 is a partially exploded front view of the dual check valve fluid distribution module.
Figure 25:
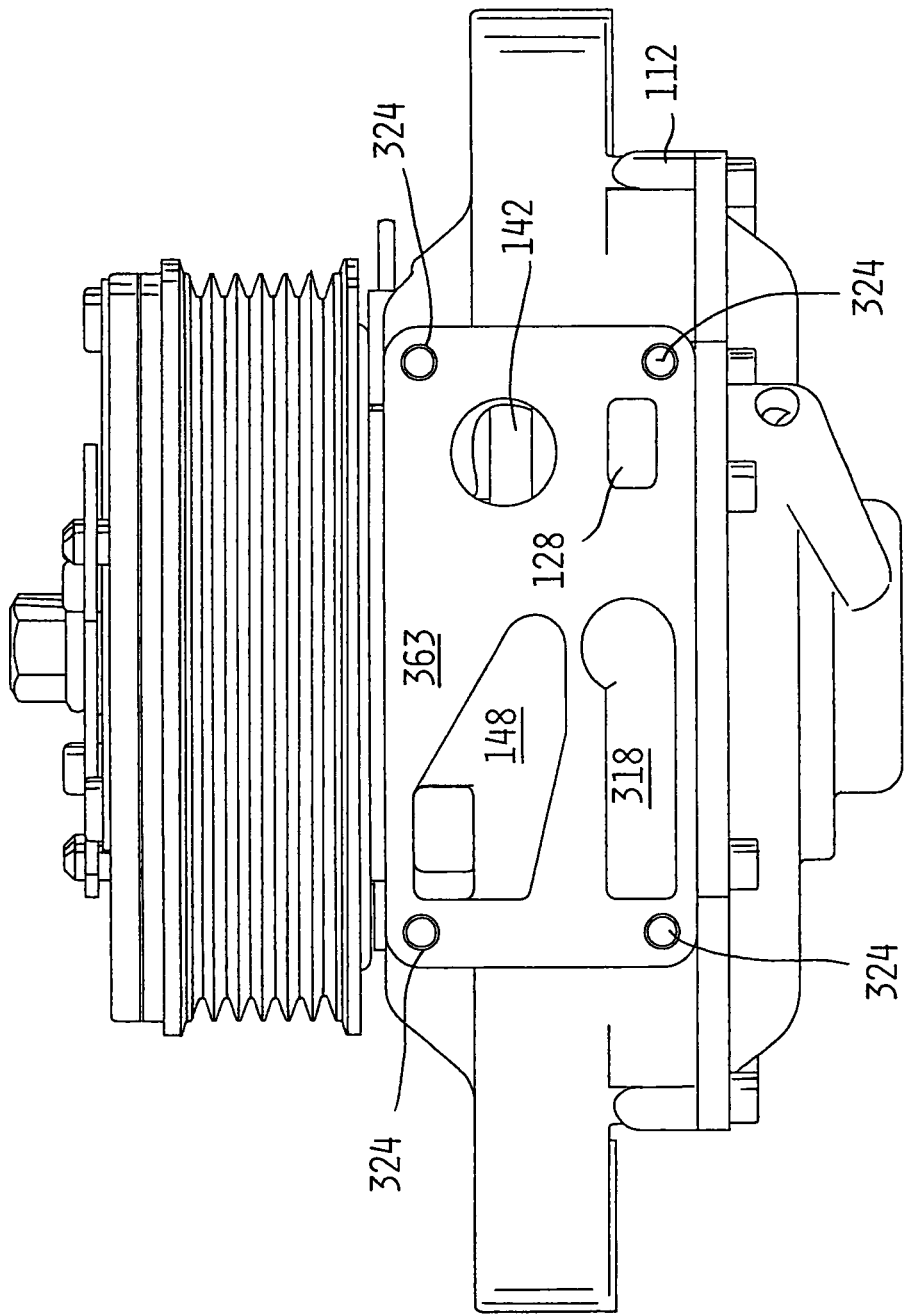
FIG. 25 is a top elevational view of the supplemental heating system with the dual check valve fluid distribution module removed.

Referring to FIGS. 20 through 22, supplemental heating system 92 may include a dual check valve fluid distribution module 310 incorporating a pair of cooperative check valves for controlling distribution of cooling fluid 46 within supplemental heating system 92. Fluid distribution module 310 performs a similar function as control valve 104, and may be used in place of control valve 104. In addition to check valve 156, a second check valve 312 can be substituted in place of control valve 104. Check valve 312 has an inlet fluidly connected to heat exchanger return passage 144, a first outlet to cooling system return passage 146, and a second outlet to recirculating passage 148. Check valves 156 and 312 may be cooperatively interconnected, such that movement of check valve 156 (the drive check valve) causes a corresponding movement of check valve 312 (the driven check valve). The two check valves may be interconnected by any variety of means, including but not limited to mechanical, electrical, hydraulic, and pneumatic means. The cooperative interconnection between drive check valve 156 and driven check valve 312 is represented by dashed line 313 in FIG. 20.

Drive check valve 156 operates to prevent cooling fluid from flowing from liquid heat exchanger discharge passage 142 to bypass passage 152 when liquid heat generator 102 is operating. Driven check valve 312 operates in response to input from drive check valve 156, to direct cooling fluid received from return passage 144 to either cooling system return passage 146, or recirculating passage 148, depending on whether the supplemental heating system is operating in the bypass or dedicated mode.

Referring also to FIGS. 23 through 31, fluid distribution module 310 may also included is a pressure regulating valve 314 selectively operable to fluidly connect recirculating passage 148 to cooling system return passage 146. An inlet bleed passage 316 fluidly connects recirculating passage 148 to an inlet of pressure regulating valve 314. A discharge bleed passage 318 fluidly connects an outlet of pressure regulating valve 314 to cooling system return passage 146.

Fluid distribution module 310 may include a manifold 320 that can be securely fastened to liquid heat generator housing 112 by means of one or more fasteners 322 that pass through an aperture 323 in the manifold body and threadably engage a corresponding aperture 324 in housing 112. Alternatively, it is also contemplated that fluid distribution module 310 may be located remotely from housing 112, which may require additional fluid lines to fluidly connect the distribution module to liquid heat generator 102.

Manifold 320 may include an upper surface 328, a lower surface 330, a front surface 332, and a rear surface 334. Extending inward from lower surface 330 is a drive check valve cavity 336 for receiving drive check valve 156. Drive check valve cavity 336 can be fluidly connected to liquid heat generator discharge passage 142 extending through liquid heat exchanger housing 112. Also extending inward from lower surface 330 is a driven check valve cavity 338 for receiving driven check valve 312. Driven check valve cavity 338 can be fluidly connected to recirculating passage 148 passing through liquid heat generator housing 112.

Extending from front surface 332 of manifold 320 is cabin heat exchanger return passage 144, which terminates at port 100, and liquid heat generator discharge passage 142, which is a continuation of discharge passage 142 passing though liquid heat generator housing 112. Liquid heat generator discharge passage terminates at port 98. Heat Exchanger discharge passage 144 is fluidly connected to driven check valve cavity 338, and return passage 142 is fluidly connected to driven check valve cavity 336.

Extending from rear surface 334 of manifold 320 is cooling system return passage 146, which terminates at port 96, and coolant supply passage 124, which terminates at port 94. Cooling system return passage 146 is fluidly connected to driven check valve cavity 338, and coolant supply passage 124 is fluidly connected to drive check valve cavity 336. Coolant supply passage 124 may also be fluidly connected to hydrodynamic chamber supply passage 128, which extends through liquid heat generator housing 112. Cooling system return passage 146 may be fluidly connected to bleed discharge passage 318, which may consist of a slot formed in an upper surface 363 of liquid heat generator housing 112.

Attached to manifold 320 is pressure regulating valve 314. Pressure regulating valve 314 may include an actuator 340 that engages an aperture 342 extending vertically through manifold 320. Pressure regulating valve 314 includes a valve spindle 344 that can be selectively extended and retracted within a housing 346 of the actuator. A disk shaped pintal 348 can be attached to an end of valve spindle 344.

Pressure regulating valve 314 may also include a cup shaped bleed valve seat 350 that also engages aperture 342 in manifold 320. Valve seat 350 may have an upstanding cylindrical sidewall 352 and a bottom wall 354. An end 356 of sidewall 352 can engage an end 358 of actuator 340. Located near a center of bottom wall is a bleed inlet orifice 360, which corresponds to inlet bleed passage 316 (see FIG. 20). Orifice 360 is in fluid communication with recirculating passage 148 that extends into liquid heat generator housing 112. Actuator 340 can control the flow of cooling fluid through orifice 360 by extending valve spindle 344 to engage pintal 348 with a circumferential edge of orifice 360, thereby sealing off the fluid path through the orifice. Conversely, cooling fluid can be permitted to flow through orifice 360 by retracting valve spindle 344 to disengage pintal 348 from orifice 360. Located adjacent inlet orifice 360 is a bleed discharge orifice 362. Orifice 362 is fluidly connected to bleed discharge passage 318.

Drive check valve 156 can be positioned within drive check valve cavity 336. Driven check valve 312 can similarly be positioned with driven check valve cavity 338. The two check valves can be fixedly attached to a common shaft 364, such that movement of drive valve 156 produces a corresponding movement of driven check valve 312. Drive shaft 364 is supported in a pair of apertures 366 extending through sidewall 352 of valve seat 350. A washer 368 can engage a recessed notch 370 formed in bottom surface 330 of manifold 320. Washer 368 provides a valve seat for drive check valve 156 when the drive check valve is operated in the bypass mode.

Figure 28:
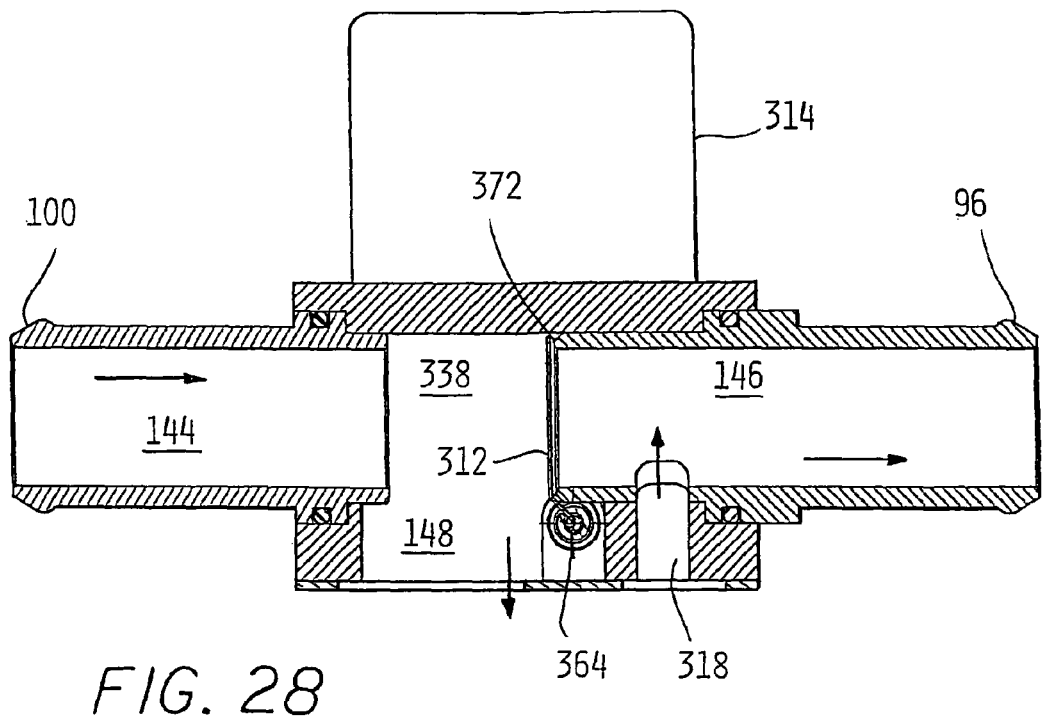
FIG. 28 is cross-section view of the dual check valve fluid distribution module taken along section 28-28, showing a driven check valve located in a dedicated mode position.
Figure 29:
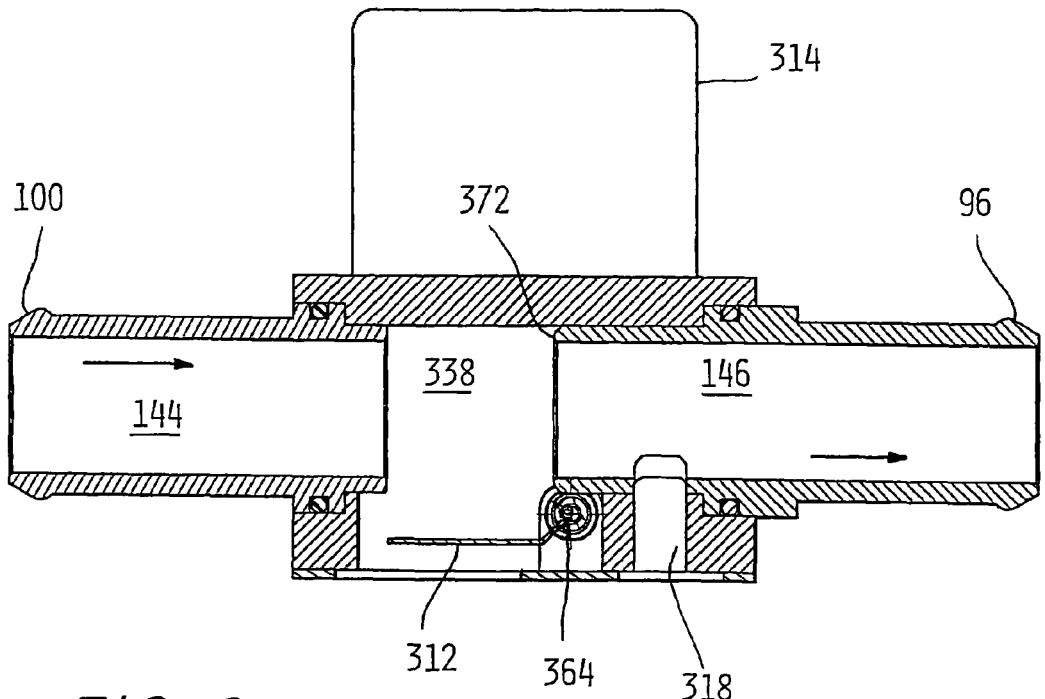
FIG. 29 is cross-section view of the dual check valve fluid distribution module taken along section 28-28, showing the driven check valve located in the bypass mode position.
Figure 30:
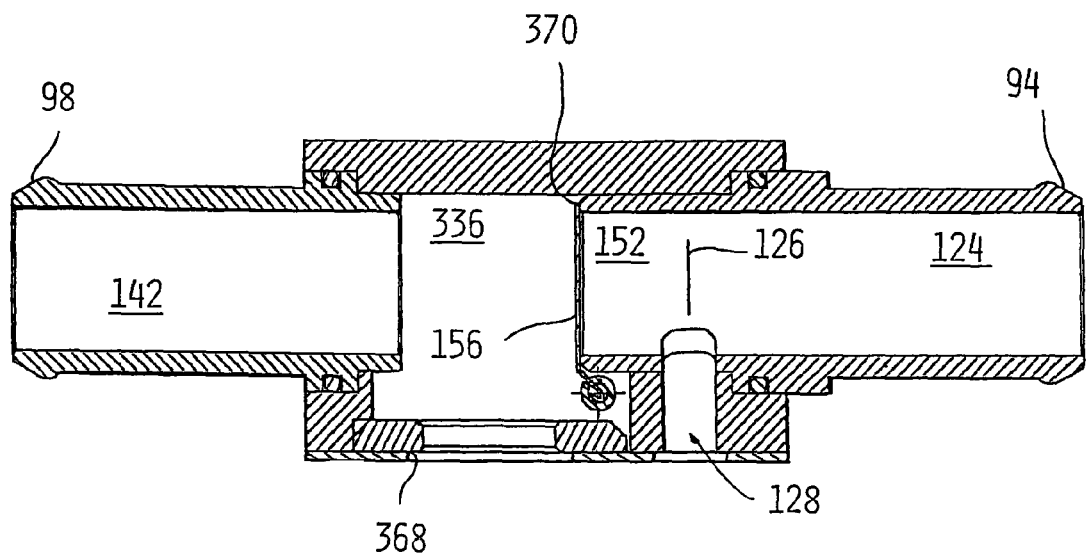
FIG. 30 is cross-section view of the dual check valve fluid distribution module taken along section 30-30, showing a drive check valve located in a dedicated mode position.
Figure 31:
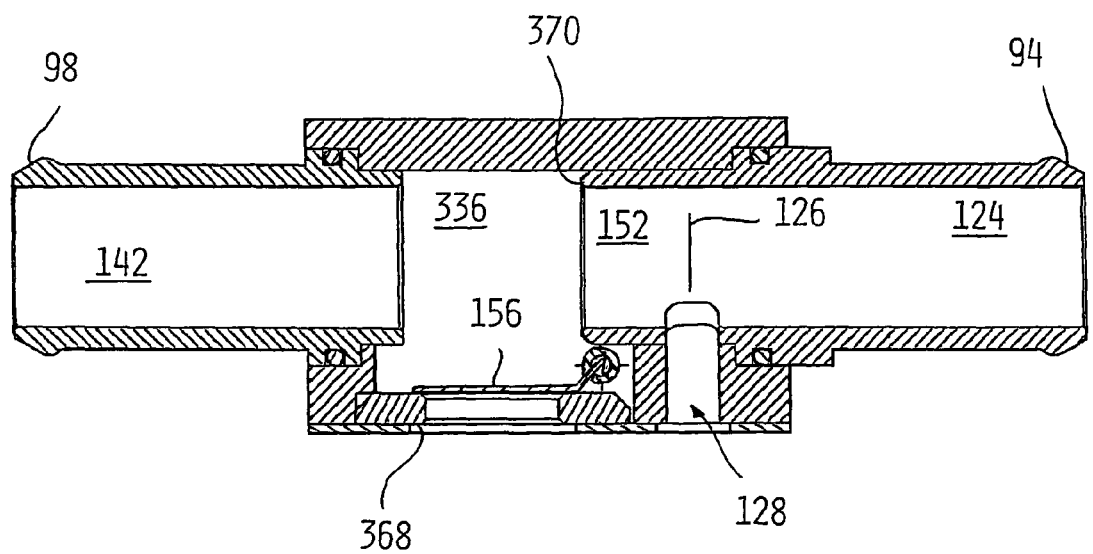
FIG. 31 is cross-section view of the dual check valve fluid distribution module taken along section 30-30, showing the drive check valve located in the bypass mode position.

Drive check valve 156 and driven check valve 312 are simultaneously rotateable about an axis of shaft 364, between a bypass position and a dedicated position. When rotated into the dedicated position, drive check valve 156 is positioned adjacent an end 370 of bypass passage 152, as shown in FIG. 30, and driven check valve 312 is positioned adjacent and end engages an end 372 of cooling system return passage 146, as shown in FIG. 28. With drive check valve 156 and driven check valve 312 rotated into the bypass position, as shown in FIGS. 31 and 29, respectively, drive check valve is seated against washer 368, and driven check valve 312 is positioned horizontally to at least partially block the entrance to recirculating passage 148.

As described previously, heating system 92 may be operated in the bypass mode, wherein cooling fluid 46 from cabin exchanger 86 is returned to engine cooling system 40, or in the dedicated mode, wherein cooling fluid 46 from cabin heat exchanger 86 is re-circulated back to liquid heat generator 102. To operate in the dedicated mode, liquid heat generator 102 can be activated by engaging clutch 164. Activating liquid heat generator 102 causes cooling fluid to flow from hydrodynamic chamber 122 through liquid heat generator discharge passage 142 to cabin heat exchanger 86. Cooling fluid 46 present in liquid heat generator discharge passage 142 will be at a higher pressure than that the cooling fluid present in bypass passage 152, which will cause drive check valve 156 to be rotated into the dedicated position adjacent end 370 of bypass passage 152. This will prevent cooling fluid from flowing between liquid heat generator discharge passage 142 and bypass passage 152. Because drive check valve 156 and driven check valve 312 are operably interconnected, activating liquid heat generator 102 will also cause driven check valve 312 to rotate to the dedicated mode position adjacent end 372 of cooling system return passage 146, thereby directing cooling fluid 46 received from heat exchanger 86 back to hydrodynamic chamber 122.

Controller 106 can monitor the pressure within recirculating passage 148 when operating supplemental heating system in the dedicated mode. If the pressure level within recirculating passage 148 exceeds some predetermined level, controller 106 can send a control signal to actuator 340, instructing the actuator to commence bleeding cooling fluid from recirculating passage 148 to cooling system return passage 146, which will cause a corresponding reduction in the pressure within hydrodynamic chamber 122. Once the pressure within recirculating passage 148 falls below a maximum desired pressure level, pressure regulating valve 314 will be instructed by control unit 106 to stop bleeding fluid from recirculating passage 148 to cooling system return passage 146.

To operate in the bypass mode, liquid heat generator 102 is deactivated by disengaging clutch 164. With liquid heat generator 102 deactivated, the fluid in bypass passage 152 will be at a higher pressure than the fluid in liquid heat generator discharge passage 142. This will cause drive check valve 156 to open the flow path between bypass passage 152 and liquid heat generator bypass passage 142, which will allow cooling fluid from engine cooling system 40 to bypass hydrodynamic chamber 122 and flow directly to heat exchanger 86. Driven check valve 312, being operably linked to drive check valve 156, will seal off the flow path between cabin heat exchanger return passage 144 and recirculating passage 148, and open the flow path between cabin heat exchanger return passage 144 and cooling system return passage 146. This will cause the cooling fluid discharged from heat exchanger 86 to bypass hydrodynamic chamber 122, and instead be directed back to engine cooling system 40.

Figure 32:
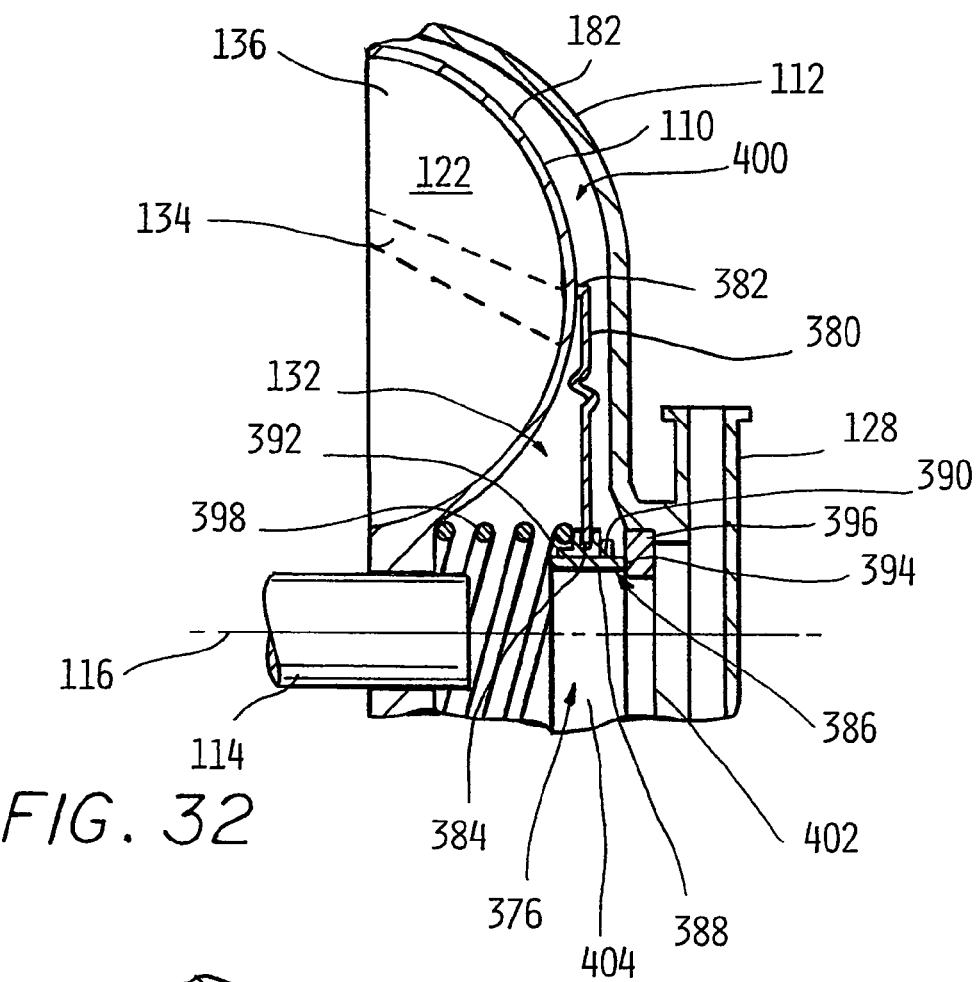
FIG. 32 is a cross-sectional view of pressure relief valve deployed with the supplemental heating system.
Figure 33:
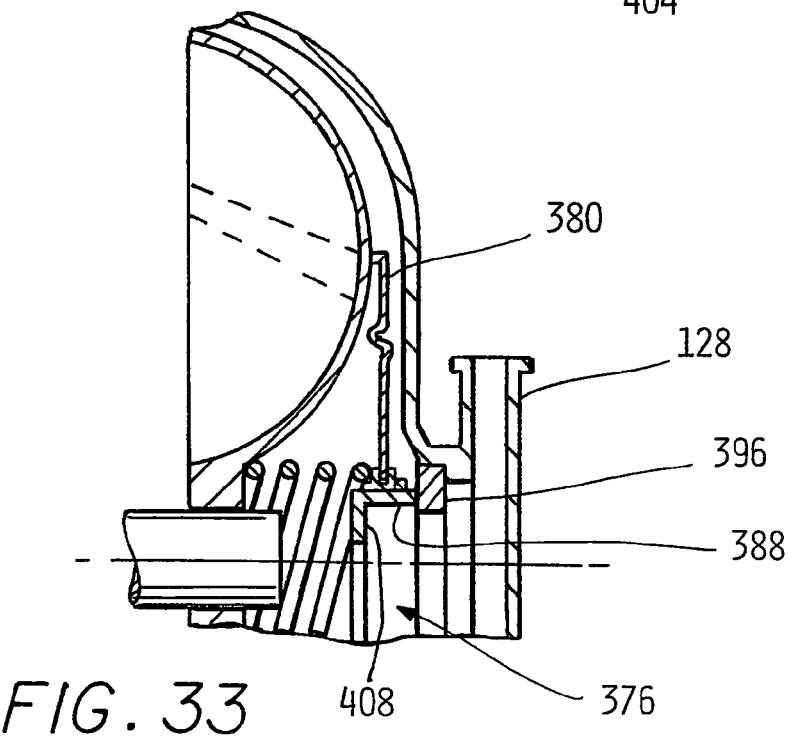
FIG. 33 is a cross-section view of the pressure relief valve of FIG. 31, further incorporating a metering orifice.

Referring to FIGS. 3, 32 and 33, supplemental heating system 92 may include a pressure relief valve 376 positioned between back wall 182 of rotor 110 and housing 112, which is operable for limiting a maximum internal operating pressure within hydrodynamic chamber 122. Pressure relief valve 376 includes a flexible disk shaped diaphragm 380 having an outer circumferential edge 382 attached to back wall 182 of rotor 110. Diaphragm 380 may include an aperture 384 located at a center of the diaphragm 380 for receiving a seal 386. Seal 386 includes a tubular shaped seal ring 388. Attached to an outer surface 390 of seal ring 388 is a grommet 392 for attaching seal ring 388 to a circumferential edge of aperture 392. A lateral end 394 of seal ring 388 slideably engages a ring shaped seal seat 396 fixedly attached to housing 112. A biasing member 398, such as spring or other elastic material, may be provided for urging seal ring 388 into contact with seal seat 396. Biasing member 398 is trapped axially between rotor 110 and seal grommet 392 in a compressed state, thereby urging seal ring 388 away from rotor 110 and into contact with ring seat 396.

Pressure relief valve 376 operates to help control a maximum pressure within hydrodynamic chamber 122 by allowing a small quantity of fluid to be discharged from a cavity 400 between housing 112 and back wall 182 of rotor 110, to hydrodynamic chamber supply passage 128 when the internal pressure exceeds some predetermined level.

Cooling fluid from engine cooling system 40 can be supplied to hydrodynamic chamber 122 through hydrodynamic chamber supply passage 128. The cooling fluid passes through an orifice 402 in seal seat 396 and through an internal passage 404 in seal ring 388. The cooling fluid travels radially outward through cavity 132 formed between back wall 182 of rotor 110 and diaphragm 380. The cooling fluid enters one or more passages 134 in blades 136 of rotor 110, and is discharged along the interface between stator 108 and rotor 110.

The fluid pressure within hydrodynamic chamber 122 is dependant on, among other things, the mass quantity of fluid present within the chamber. Hydrodynamic chamber 122 is in fluid communication with cavity 400 between housing 112 and the back of rotor 110, and the pressure within cavity 400 can reasonably approximate the pressure within hydrodynamic chamber 122. As the pressure increases within hydrodynamic chamber 122, so does the pressure within cavity 400. An increase in pressure within cavity 400 will generally increase the pressure drop across diaphragm 380. When the pressure within cavity 400 reaches a level at which the pressure force applied along the cavity 400 side of diaphragm 380 exceeds the sum of the pressure force being exerted along the opposite cavity 132 side of the diaphragm, plus the biasing force of biasing member 398, seal ring 388 will become disengaged from ring seat 396, thereby allowing a quantity of cooling fluid to flow from cavity 400 to hydrodynamic chamber supply passage 128. This will result in a decrease in the quantity of fluid present within hydrodynamic chamber 122, which will produce a corresponding decrease in pressure within the hydrodynamic chamber. As the pressure within hydrodynamic chamber 122 continues to decrease, seal ring 388 will move toward seal seat 396 until the pressure within hydrodynamic chamber 122 is below a desired level, at which point seal ring 386 will seat against ring seat 396 and prevent any further flow of fluid between cavity 400 and supply passage 128. The pressure level at which seal ring 388 begins to be displaced from ring seat 396 can be calibrated by adjusting the spring rate of biasing member 398.

With reference to FIG. 33, to aid in the operation of the pressure relief valve 376, seal ring 388 may include a calibrated orifice plate 408, which operates to restrict the flow area through seal ring 388 and increase the differential pressure across diaphragm 380. The force tending to move seal ring 388 away from ring seat 396 would thus be the sum of the pressure force applied to the cavity 400 side of diaphragm 380 plus the pressure force applied to the supply passage 128 side of orifice plate 408.

Figure 34:
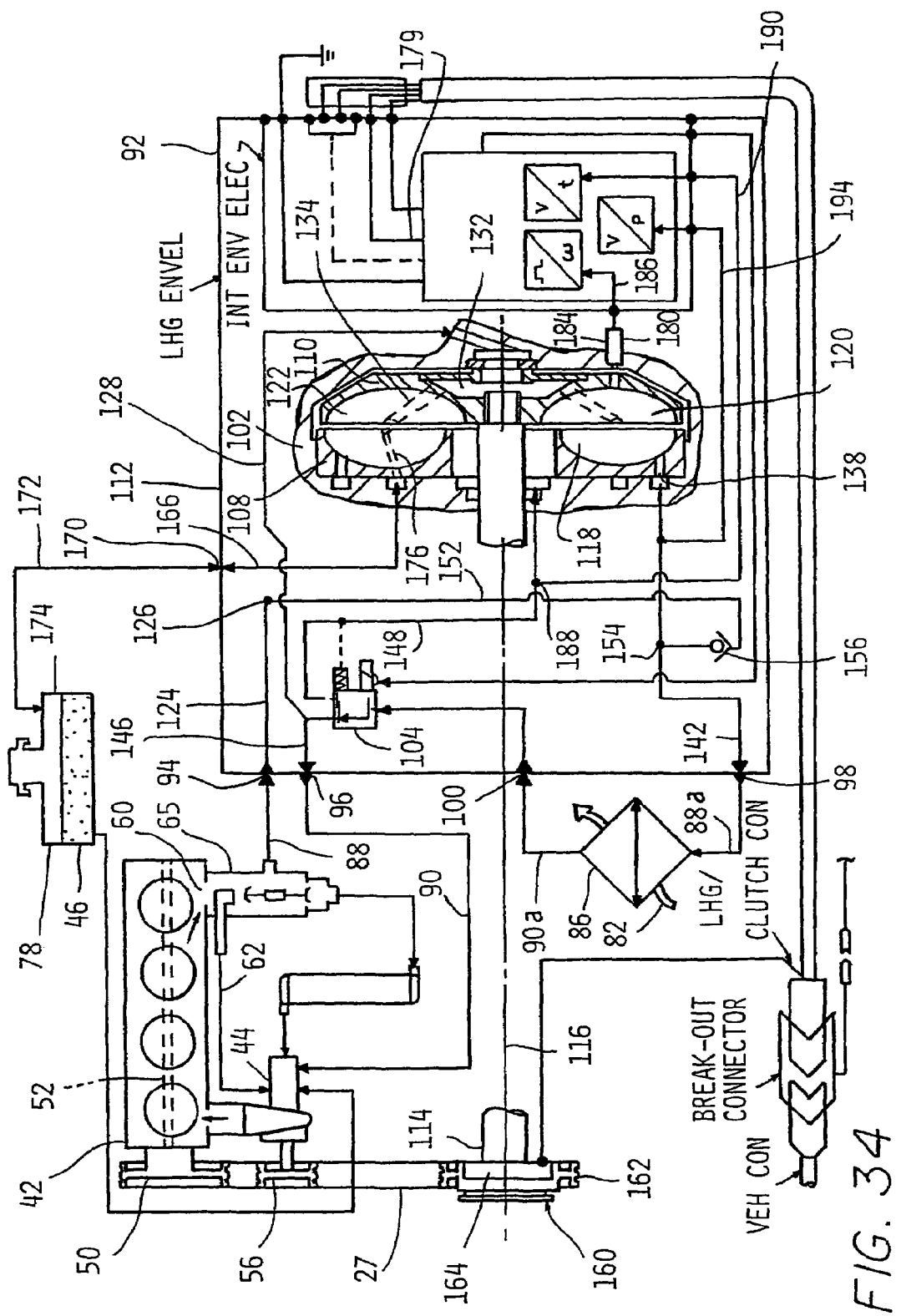
FIG. 34 is a schematic depiction of the supplemental heating system employing the spool valve, the supplemental heating system having an inlet fluidly connected to a vehicle water pump.
Figure 35:
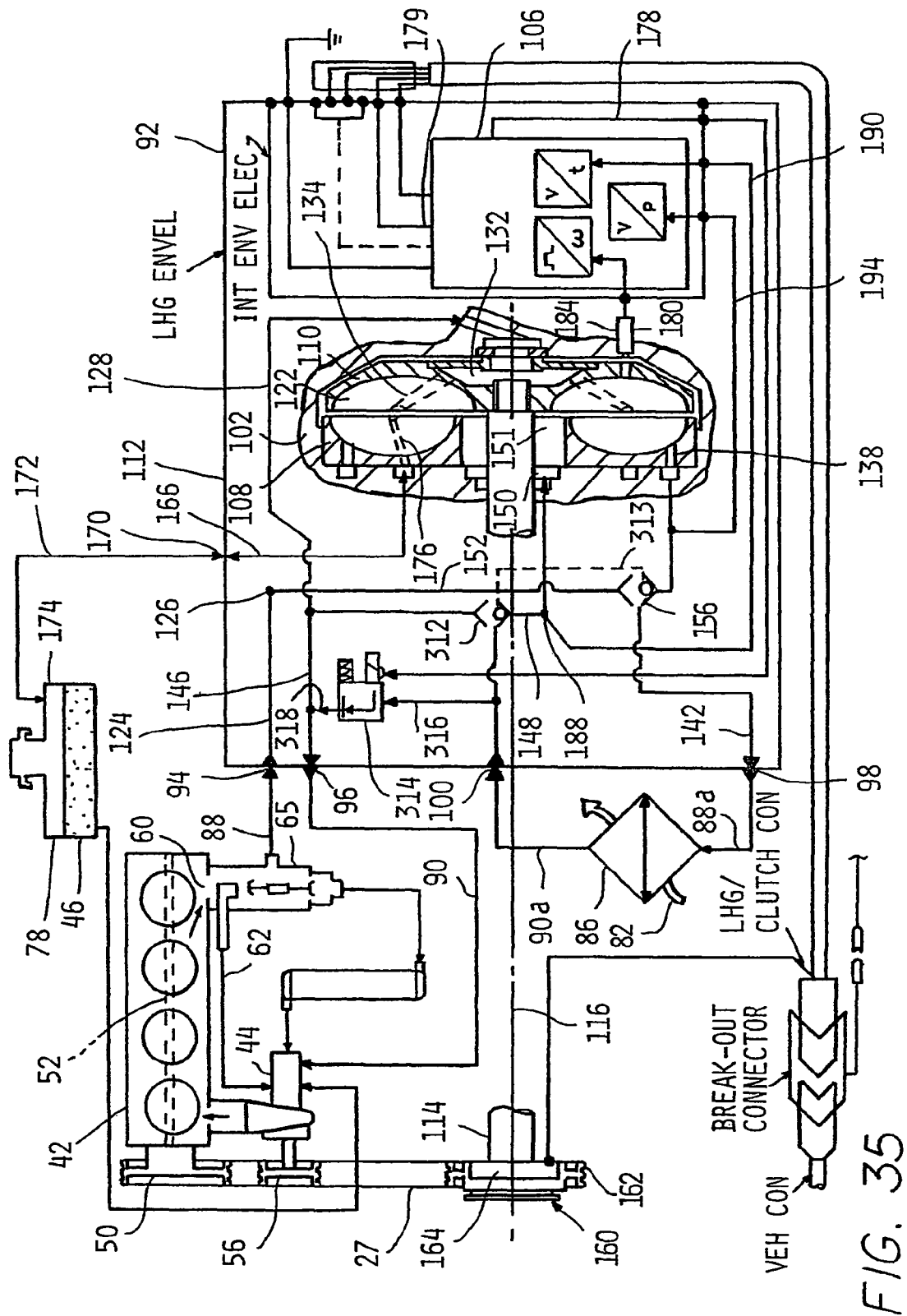
FIG. 35 is a schematic depiction of the supplemental heating system employing the dual check valve fluid distribution module, the supplemental heating system having an inlet fluidly connected to the vehicle water pump.

Under certain operating conditions, it may be possible to improve the performance of pressure relief valve 376 by fluidly connecting hydrodynamic chamber supply passage 128 to an inlet of water pump 44 rather than thermostat 65. This can be accomplished for a supplemental heating system utilizing fluid distribution module 198 incorporating the spool valve, by altering the fluid connections shown in FIG. 3 to correspond with those shown in FIG. 34. Instead of fluidly connecting hydrodynamic chamber supply passage 128 to fluid junction 126, hydrodynamic chamber supply passage 128 can be fluidly connected to cooling system return passage 146. A similar modification can be done for a supplemental heating system incorporating dual check valve fluid distribution module 310, as FIG. 35.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A heating apparatus connectable to an engine cooling system of a vehicle, the cooling system including a cooling fluid circulating within the cooling system and a heat exchanger for transferring heat from the cooling fluid to an airstream for heating a passenger compartment of the vehicle, the heating apparatus comprising:

a liquid heat generator having a hydrodynamic chamber operable for selectively heating the cooling fluid present within the hydrodynamic chamber when the heating apparatus is connected to the cooling system, the hydrodynamic chamber having an inlet port and a discharge port;

a first valve including an inlet port fluidly connectible to an exit port of the heat exchanger, a first discharge port fluidly connected to the inlet port of the hydrodynamic chamber and second discharge port fluidly connectable to the engine cooling system, the first valve operable for selectively adjusting a fluid path between the first valve and the inlet port of the hydrodynamic chamber; and a second valve having a first inlet port fluidly connected to the discharge port of the hydrodynamic chamber, a second inlet port fluidly connectable to the engine cooling system and a discharge port fluidly connectable to an inlet port of the heat exchanger, the second valve operably connected to the first valve, wherein the first valve adjusts the fluid path between the first valve and the inlet port of the hydrodynamic chamber in response to an input received from the second valve, and wherein the first valve is adjustable to fluidly connect the inlet port of the first valve to the second discharge port of the first valve in response to adjusting the second valve to fluidly connect the second inlet port of the second valve to the outlet port of the second valve.

2. The heating apparatus of claim 1, wherein the first valve is adjustable to fluidly connect the inlet port of the first valve to the first discharge port of the first valve in response to adjusting the second valve to fluidly connect the first inlet port of the second valve to the outlet port of the second valve.

3. The heating apparatus of claim 1, wherein the second valve fluidly connects the first inlet port of the second valve to the outlet port of the second valve when the hydrodynamic chamber is operating.

4. The heating apparatus of claim 1, wherein the second valve fluidly connects the second inlet port of the second valve to the outlet port of the second valve when the hydrodynamic chamber is not operating.

5. The heating apparatus of claim 1, wherein the first valve fluidly connects the inlet port of the first valve to the first outlet port of the first valve when the hydrodynamic chamber is operating.

6. The heating apparatus of claim 1, wherein the first valve fluidly connects the inlet port of the first valve to the second outlet port of the first valve when the hydrodynamic chamber is not operating.

7. A heating apparatus connectable to an engine cooling system of a vehicle, the cooling system including a cooling fluid circulating within the cooling system and a heat exchanger for transferring heat from the cooling fluid to an airstream for heating a passenger compartment of the vehicle, the heating apparatus comprising:

a liquid heat generator having a hydrodynamic chamber operable for selectively heating the cooling fluid present within the hydrodynamic chamber when the heating apparatus is connected to the cooling system, the hydrodynamic chamber having an inlet port and a discharge port;

a first valve having a first discharge port fluidly connected to the inlet port of the hydrodynamic chamber, the first valve operable for selectively adjusting a fluid path between the first valve and the inlet port of the hydrodynamic chamber, the first valve including an inlet port fluidly connectible to an exit -port of the heat exchanger and a second discharge port fluidly connectable to the engine cooling system;

a second valve having a first inlet port fluidly connected to the discharge port of the hydrodynamic chamber, the second valve operably connected to the first valve, wherein the first valve adjusts the fluid path between the first valve and the inlet port of the hydrodynamic chamber in response to an input received from the second valve, the second valve including a second inlet port fluidly connectable to the engine cooling system and a discharge port fluidly connectable to an inlet port of the heat exchanger; and a third valve having an inlet passage fluidly connected to the inlet port of the first valve, and an outlet passage fluidly connected to the second outlet port of the first valve.

8. The heating apparatus of claim 7, wherein the third valve is operable to selectively connect the inlet port of the first valve fluidly to the second outlet port of the first valve when the hydrodynamic chamber is operating.

9. The heating apparatus of claim 1, wherein the first and second valves operate in unison.

10. The heating apparatus of claim 1, wherein operation of one of the first valve and the second valve is controlled by the remaining valve.

11. The heating apparatus of claim 10, wherein the first valve comprises a first valve flap and the second valve comprises a second valve flap, the heating apparatus further comprising an actuating link operably connecting the first valve flap to the second valve flap.

12. The heating apparatus of claim 11, wherein the second valve flap is moveable between a first position, in which the second valve flap substantially blocks a fluid path between the first inlet port of the second valve and the of the second valve, and a second position, in which the second valve flap substantially blocks a fluid path between the second inlet port of the second valve and the discharge port of the second valve.

13. The heating apparatus of claim 12, wherein a flow path between the inlet port of the first valve and the second discharge port of the first valve is substantially blocked when the second valve flap is positioned in its second position.

14. The heating apparatus of claim 11, wherein the actuating link comprises a shaft rotatable about a longitudinal axis of the shaft, wherein the first and second valve flaps are fixedly attached to the shaft for concurrent rotation therewith.

15. The heating apparatus of claim 11, wherein the first valve flap is selectively moveable between a first position, in which the first valve flap substantially blocks a fluid path between the inlet port of the first valve and the first discharge port of the first valve, and a second position, in which a fluid path between the inlet port of the first valve and the first discharge port of the first valve is substantially unimpeded by the first valve flap.

16. The heating apparatus of claim 10, wherein the inlet port of the first valve is fluidly connected to the first discharge passage of the first valve in response to adjusting the second valve to fluidly connect the first inlet port of the second valve to the discharge port of the second valve.

17. The heating apparatus of claim 16, wherein the inlet port the first valve is fluidly connected to the second discharge port of the first valve in response to adjusting the second valve to fluidly connect the second inlet port of the second valve to the discharge port of the second valve.

18. The heating apparatus of claim 10, further comprising of third valve having a valve seat, a valve spindle selectively engageable with the valve seat, and an actuator connected to the valve spindle, the actuator operable for selectively disengaging the valve spindle from the valve seat.

19. A heating system for providing heat to a passenger compartment of a vehicle, the heating system comprising:

an engine cooling system including a cooling fluid;

a heat exchanger operable for transferring heat from the cooling fluid to an airstream deliverable to the passenger compartment;

a liquid heat generator having a hydrodynamic chamber operable for selectively heating the cooling fluid present within the hydrodynamic chamber when the heating apparatus is connected to the cooling system, the hydrodynamic chamber having an inlet port and a discharge port;

a first valve having an inlet port fluidly connected to a discharge port of the heat exchanger, a first discharge port fluidly connected to the inlet port of the hydrodynamic chamber and a second discharge port fluidly connected to the engine cooling system, the first valve operable for selectively adjusting a fluid path between the first valve and the inlet port of the hydrodynamic chamber and blocking a fluid flow path between the heat exchanger and the engine cooling system; and a second valve having a discharge port fluidly connected to an inlet port of the heat exchanger and a first inlet port fluidly connected to the discharge port of the hydrodynamic chamber, the second valve operably connected to the first valve and operable for selectively blocking a fluid flow path between the hydrodynamic chamber and the heat exchanger, wherein the first valve adjusts the fluid path between the first valve and the inlet port of the hydrodynamic chamber in response to an input received from the second valve.

20. The heating apparatus of claim 19, further comprising an actuating link operably connecting the first valve to the second valve, wherein movement of one of the two valves produces concurrent movement of the remaining valve.

21. The heating apparatus of claim 20, wherein the second valve further comprises a second inlet port fluidly connected to the engine cooling system.

22. The heating apparatus of claim 21, wherein the first valve is adjustable to open a fluid path between the discharge port of the heat exchanger and the engine cooling system in response to the second valve substantially blocking a fluid path between the discharge port of the hydrodynamic chamber and the inlet port of the heat exchanger.

23. The heating of claim 21, wherein the first valve is adjustable to substantially block a fluid path between the discharge port of the heat exchanger and the engine cooling system in response to the second valve substantially blocking a fluid path between the engine cooling system and the inlet port of the heat exchanger.

24. The heating of claim 19, further comprising:

a bleed valve having an inlet passage fluidly connected to the discharge port of the heat exchanger and an outlet passage fluidly connected to the engine cooling system, wherein the bleed valve is operable for selectively establishing a fluid path between the discharge port of the heat exchanger and the engine cooling system.

25. The heating apparatus of claim 24, wherein the bleed valve is operable to selectively establish a fluid path between the discharge port of the heat exchanger and the engine cooling system when the first valve is adjusted to substantially block the fluid path between the discharge port of the heat exchanger and the engine cooling system.

* * * * *